United States Patent
Jeon et al.

(10) Patent No.: US 12,242,625 B2
(45) Date of Patent: Mar. 4, 2025

(54) PCIE FUNCTION AND OPERATING METHOD THEREOF

(71) Applicant: SK hynix Inc., Icheon (KR)

(72) Inventors: Yong Tae Jeon, Icheon (KR); Jae Young Jang, Icheon (KR); Seung Duk Cho, Icheon (KR)

(73) Assignee: SK hynix Inc., Icheon (KR)

( * ) Notice: Subject to any disclaimer, the term of this patent is extended or adjusted under 35 U.S.C. 154(b) by 323 days.

(21) Appl. No.: 17/504,346

(22) Filed: Oct. 18, 2021

(65) Prior Publication Data
US 2022/0327228 A1    Oct. 13, 2022

(30) Foreign Application Priority Data

Apr. 13, 2021 (KR) .................. 10-2021-0048077

(51) Int. Cl.
*G06F 21/62* (2013.01)
*G06F 13/42* (2006.01)

(52) U.S. Cl.
CPC ...... *G06F 21/6218* (2013.01); *G06F 13/4282* (2013.01); *G06F 2213/0026* (2013.01)

(58) Field of Classification Search
CPC ............ G06F 21/6218; G06F 13/4282; G06F 2213/0026; G06F 21/629; G06F 13/4221; G06F 13/385; G06F 7/58; G06F 13/4022; G06F 13/404
See application file for complete search history.

(56) References Cited

U.S. PATENT DOCUMENTS

| | | | |
|---|---|---|---|
| 6,647,434 B1 * | 11/2003 | Kamepalli | G06F 13/387 710/10 |
| 7,979,592 B1 | 7/2011 | Pettey et al. | |
| 8,503,468 B2 | 8/2013 | Akyol et al. | |
| 10,007,545 B2 | 6/2018 | Graham et al. | |
| 10,635,499 B2 | 4/2020 | Huynh | |

(Continued)

FOREIGN PATENT DOCUMENTS

| | | |
|---|---|---|
| CN | 108028813 A | 5/2018 |
| JP | 2010016819 A | 1/2010 |

(Continued)

OTHER PUBLICATIONS

PCIe Express, PCI Express Base Specification 3.0, Nov. 10, 2010, pp. 1-4, 97-122 (Year: 2010).

(Continued)

*Primary Examiner* — Baotran N To

(57) ABSTRACT

A Peripheral Component Interconnect Express (PCIe) function includes an access identification information controller generating first access identification information for allowing an access to the PCIe function, and providing the first access identification information to an assigned system image to which the PCIe function has been assigned, the assigned system image being one of a plurality of system images, a data packet receiver receiving a data packet including target identification information indicating a target system image selected from the plurality of system images from the target system image, and an access allowance determiner determining whether or not to allow an access of the target system image based on the first access identification information and the target identification information.

41 Claims, 15 Drawing Sheets

(56) References Cited

U.S. PATENT DOCUMENTS

| | | | |
|---|---|---|---|
| 11,928,070 B2* | 3/2024 | Jeon | G06F 1/08 |
| 2010/0115174 A1* | 5/2010 | Akyol | G06F 13/385 |
| | | | 710/316 |
| 2011/0106981 A1 | 5/2011 | Watkins et al. | |
| 2013/0339955 A1 | 12/2013 | Prawer et al. | |
| 2017/0277573 A1 | 9/2017 | Huynh | |
| 2018/0239737 A1 | 8/2018 | Cha et al. | |
| 2018/0367518 A1 | 12/2018 | Singh et al. | |
| 2019/0042350 A1* | 2/2019 | Nadathur | G06F 11/0706 |
| 2019/0042741 A1 | 2/2019 | Abodunrin et al. | |
| 2020/0004703 A1 | 1/2020 | Sankaran et al. | |
| 2020/0278935 A1 | 9/2020 | Borikar et al. | |
| 2020/0409732 A1 | 12/2020 | Kovacevic | |
| 2021/0200703 A1* | 7/2021 | Simionescu | G06F 13/4295 |
| 2021/0247935 A1* | 8/2021 | Beygi | G06F 3/0664 |
| 2022/0188073 A1 | 6/2022 | Bowman et al. | |
| 2022/0300442 A1 | 9/2022 | Jeon et al. | |
| 2022/0300448 A1 | 9/2022 | Jeon | |
| 2022/0327080 A1* | 10/2022 | Jeon | G06F 13/4022 |
| 2022/0327081 A1 | 10/2022 | Jeon et al. | |
| 2022/0327082 A1* | 10/2022 | Jeon | G06F 13/4045 |
| 2022/0327228 A1* | 10/2022 | Jeon | G06F 21/6218 |
| 2024/0168911 A1* | 5/2024 | Jeon | G06F 13/4045 |

FOREIGN PATENT DOCUMENTS

| | | | |
|---|---|---|---|
| KR | 1020130034036 A | 4/2013 | |
| KR | 101704776 B1 | 2/2017 | |
| KR | 1020170013713 A | 2/2017 | |
| KR | 1020170051475 A | 5/2017 | |
| KR | 1020170057237 A | 5/2017 | |
| KR | 1020210024195 A | 3/2021 | |

OTHER PUBLICATIONS

Office Action dated Mar. 30, 2023 for U.S. Appl. No. 17/504,351.
Office Action dated Mar. 2, 2023 for U.S. Appl. No. 17/504,884.
Office Action dated Apr. 6, 2023 for U.S. Appl. No. 17/506,610.
Final Office Action dated Sep. 14, 2023 for U.S. Appl. No. 17/504,351.
"PCI Express® Base Specification Revision 4.0 Version 1.0", PCI Express, Sep. 27, 2017.
Notice of Allawance dated Mar. 7, 2024 for U.S. Appl. No. 17/504,351.
"Virtual Function Number Assignment", An IP.com Prior Art Database Technical Disclosure, Jul. 11, 2008, URL:https://priorart.ip.com/IPCOM/000172526.
Office Action dated Jul. 30, 2024 for the U.S. Appl. No. 18/406,919.
Jose Fernando Zazo et al., "A PCIe OMA engine to support the virtualization of 40 Gbps FPGA-accelerated network appliances," IFEE, Dec. 7, 2015.
Office Action dated Nov. 27, 2024 for U.S. Appl. No. 18/659,773.

* cited by examiner

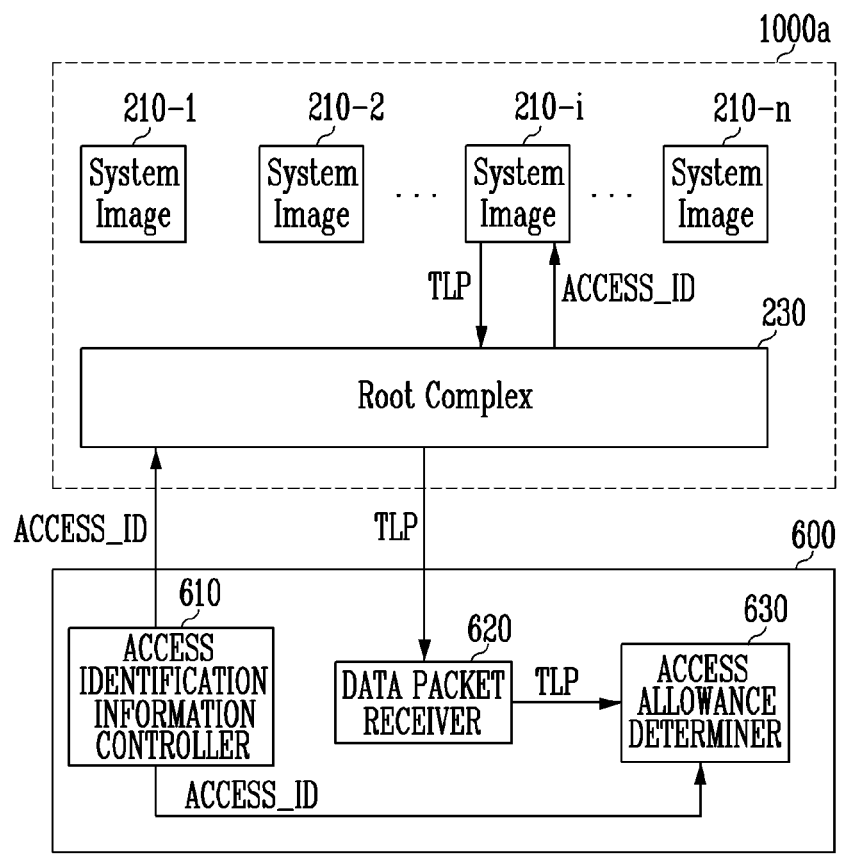

PCIE FUNCTION AND OPERATING METHOD THEREOF

CROSS-REFERENCE TO RELATED APPLICATION

The present application claims priority under 35 U.S.C. § 119(a) to Korean patent application number 10-2021-0048077, filed on Apr. 13, 2021, which is incorporated herein by reference in its entirety.

BACKGROUND

Field of Invention

The present disclosure relates to an electronic device, and more particularly, to a Peripheral Component Interconnect Express (PCIe) function and an operating method thereof.

Description of Related Art

Recently, Peripheral Component Interconnect Express (PCIe) device may define a bus protocol which is used to connect input/output devices to a host device. PCI Express (PCIe) has the concept of programming defined by the PCI standards and includes a physical communication layer defined as a high-speed serial interface.

A storage device may store data in response to control of a host device such as a computer or a smartphone. The storage device may include a memory device which stores data and a memory controller which controls the memory device. Memory devices may be divided into volatile memory devices and non-volatile memory devices.

A volatile memory device may retain data as long as power is being supplied, and may lose the stored data in the absence of power supply. Types of volatile memory devices may include Static Random Access Memory (SRAM), Dynamic Random Access Memory (DRAM), and the like.

A non-volatile memory device may not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM) and flash memory.

SUMMARY

Various embodiments are directed to a PCIe function with high operating speed and high security, and an operating method thereof.

According to an embodiment, a Peripheral Component Interconnect Express (PCIe) function may include an access identification information controller generating first access identification information for allowing an access to the PCIe function, and providing the first access identification information to an assigned system image to which the PCIe function has been assigned, the assigned system image being one of a plurality of system images, a data packet receiver receiving a data packet including target identification information indicating a target system image selected from the plurality of system images from the target system image, and an access allowance determiner determining whether or not to allow an access of the target system image based on the first access identification information and the target identification information.

According to an embodiment, a computing system may include a plurality of Peripheral Component Interconnect Express (PCIe) functions and a host including a plurality of system images, generating access identification information for allowing an access to a PCIe function among the plurality of PCIe function that is assigned to a corresponding system image of the plurality of system images, and providing the access identification information to the PCIe function, and the PCIe function storing the access identification information provided from the host, receiving a data packet including target identification information indicating a target system image from the target system image, the target system image being one of the plurality of system images, and determining whether or not to allow an access of the target system image based on the access identification information and the target identification information.

According to an embodiment, a method for operating a Peripheral Component Interconnect Express (PCIe) function assigned to one of a plurality of system images may include generating access identification information for allowing an access to the PCIe function, providing the access identification information to an assigned system image, receiving a data packet including target identification information indicating a target system image among the plurality of system images from the target system image, and determining whether or not to allow an access of the target system image based on the access identification information and the target identification information.

BRIEF DESCRIPTION OF THE DRAWINGS

FIG. 6 illustrates a PCIe function according to an embodiment of the present disclosure;

FIG. 7 illustrates a structure of a transaction layer packet (TLP) according to an embodiment of the present disclosure;

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Figure 1:
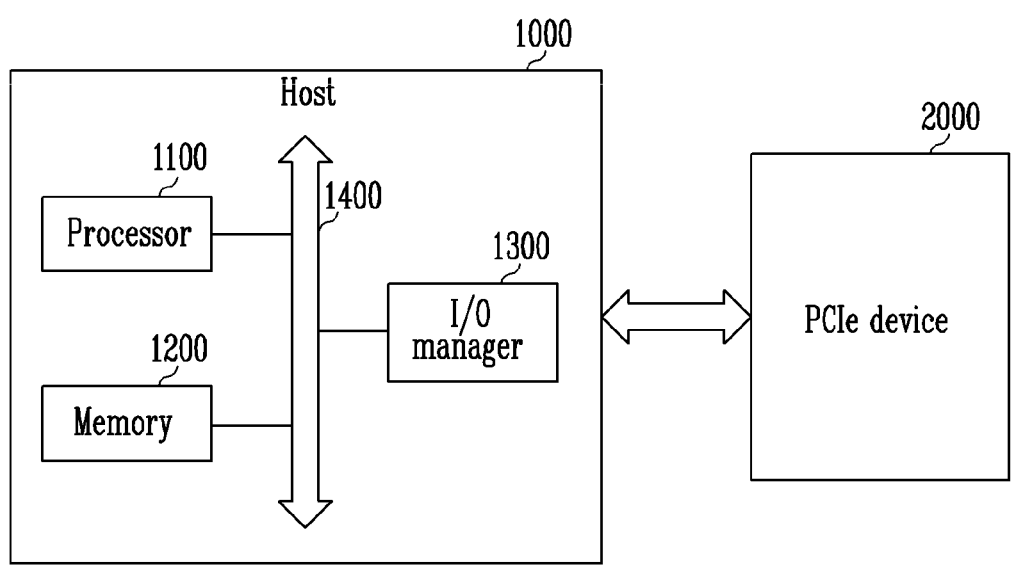
FIG. 1 illustrates an example of a computing system according to an embodiment of the present disclosure.

FIG. 1 illustrates an example of a computing system 100 according to an embodiment of the present disclosure.

Referring to FIG. 1, the computing system 100 may include a host 1000 and a Peripheral Component Interconnect Express (PCIe) device 2000. The computing system 100 may be, for example, a cellular phone, a smartphone, an MP3 player, a laptop computer, a desktop computer, a game player, a TV, a tablet PC, or an in-vehicle infotainment system.

The host 1000 may include a processor 1100, a memory 1200, an input/output (I/O) manager 1300, and a bus 1400. Components of the host 1000 may exchange signals and data through the bus 1400.

The processor 1100 may include circuits, interfaces, or program codes for processing data and controlling operations of components of the computing system 100. For example, the processor 1100 may include a CPU (such as an ARM® processor), a microcontroller, or an application specific integrated circuit (ASIC).

The memory 1200 may include SRAM or DRAM that stores data, commands, or program codes necessary for operations of the computing system 100. However, the processor 1100 may also include a non-volatile memory. According to an embodiment, the memory 1200 may include program codes that may operate to execute one or more operating systems (OS) and virtual machines (VM) and program codes that execute a virtualization intermediary (VI) for managing the virtual machines.

The processor 1100 may execute one or more operating systems and virtual machines by driving the program codes stored in the memory 1200. In addition, the processor 1100 may execute the virtualization intermediary for managing the virtual machines. In this manner, the processor 1100 may control operations of the components of the computing system 100.

The I/O manager 1300 may be an adapter that connects input/output devices to the host 1000. For example, the I/O manager 1300 may include a Universal Serial Bus (USB) adapter, a Peripheral Component Interconnect (PCI) or a PCI Express (PCIe) adapter, a Small Computer System Interface (SCSI) adapter, a Serial AT Attachment (SATA) adapter, a NonVolatile Memory express (NVMe) adapter, or combinations thereof. The I/O manager 1300 may include circuits, interfaces, or codes that are operable to communicate information with devices connected to the computing system 100. The I/O manager 1300 may include one or more standardized buses and one or more bus controllers. Therefore, the I/O manager 1300 may perceive the devices connected to the bus 1400, list the devices connected to the bus 1400, and perform resource allocation and deallocation for various devices connected to the bus 1400. In other words, the I/O manager 1300 may operate to manage communications over the bus 1400. For example, the I/O manager 1300 may be a PCI or PCIe system and include PCIe root complex (RC), one or more PCIe switches, or bridges. For example, the I/O manager 1300 may be controlled by the virtualization intermediary.

PCI may define a bus protocol that is used to connect the I/O devices to the processor 1100. PCIe may have the concept of programming defined by the PCI standards and define a physical communication layer as a high-speed serial interface.

The PCIe device 2000 may communicate with the host 1000 using PCIe. For example, the PCIe device 2000 may be implemented as various I/O device types such as networks and storages.

According to an embodiment, the PCIe device 2000 may be defined as an endpoint or a device including an endpoint.

An endpoint may refer to a type of a function that may be a requester or a completer of a PCIe transaction. Endpoints may be classified into legacy endpoints, PCI Express (PCIe) endpoints, or root complex integrated (RCiEP) endpoints.

A legacy endpoint may be a function with a type 00h configuration space header. A legacy endpoint may support configuration requests as a completer. A legacy endpoint may support I/O requests as a completer. A legacy endpoint may accept I/O requests for either or both of 80h and 84h locations regardless of an I/O decode configuration of the corresponding endpoint. A legacy endpoint may support I/O requests. A legacy endpoint must not issue a locked request. A legacy endpoint may implement extended configuration space capabilities. A legacy endpoint operating as a requester of a memory transaction may not be required to generate addresses of 4 GB or more. When an interrupt resource is requested, a legacy endpoint may be required to support Message Signaled Interrupt (MSI) or MSI-X, or both. When MSI is implemented, a legacy endpoint may support a 32-bit or 64-bit message address version with an MSI functional structure. A legacy endpoint may support 32-bit address designation with respect to a base address register requesting a memory resource. A legacy endpoint may appear within one of the hierarchy domains originated by a root complex.

A PCIe endpoint may be a function with a type 00 h configuration space header. A PCIe endpoint may support configuration requests as a completer. A PCIe endpoint must not depend on operating system allocation of I/O resources claimed through base address registers (BARs). A PCIe endpoint may not generate I/O requests. A PCIe endpoint may not support locked requests as a completer or generate locked requests as a requester. PCIe-compliant software drivers and application programs may be written to prevent the use of lock semantics when accessing a PCIe endpoint. A PCIe endpoint operating as a requester of a memory transaction may generate an address of more than 4 GB. A PCIe endpoint may be required to support Message Signaled Interrupt (MSI), MSI-X, or both when an interrupt resource is requested. When MSI is implemented, a PCIe endpoint may support a 64-bit message address version with an MSI functional structure. A minimum address range requested by a base address register may be 128 bytes. A PCIe endpoint may appear within one of the hierarchy domains originated by a root complex.

RCiEPs may be implemented on internal logic of root complexes that contains root ports. An RCiEP may be a function with a type 00 h configuration space header. An RCiEP may support configuration requests as a completer. An RCiEP may not request I/O resources claimed through base address registers. An RCiEP may not generate I/O requests. An RCiEP may not support locked requests as a completer or generate locked requests as a requester. PCIe-compliant software drivers and application programs may be written to prevent the use of lock semantics when accessing an RCiEP. An RCiEP operating as a requester of a memory transaction may generate an address equal to or greater than that which may be processed by the host 1000 as a completer. An RCiEP may be required to support MSI, MSI-X, or both when an interrupt resource is requested. When MSI is implemented, an RCiEP may support a 32-bit or 64-bit message address version with an MSI functional structure. An RCiEP may support 32-bit address designation with respect to a base address register requesting a memory resource. An RCiEP may implement link capabilities, link status, link control, link capabilities 2, link status 2, and link control 2 registers in the PCIe extended capability. An RCiEP may not implement active state power management. An RCiEP may not be hot-plugged independent of the root complex as a whole. An RCiEP may not appear in hierarchy domains exposed by the root complex. An RCiEP may not appear in switches.

According to an embodiment, the PCIe device 2000 may generate at least one virtual device. For example, the PCIe device 2000 may store program codes for generating at least on virtual device.

According to an embodiment, the PCIe device 2000 may generate a physical function (PF) device, a virtual function (VF) device, or a base function (BF) device in response to a virtualization request received from the host 1000. For example, a physical function device may be configured as a virtual device in which a virtualization intermediary is granted access rights. A virtual function device may be configured as a virtual device that is assigned to a virtual machine of the host 1000. The base function device may be configured as a virtual device that is used in a virtualization environment including a plurality of root complexes.

Figure 2:
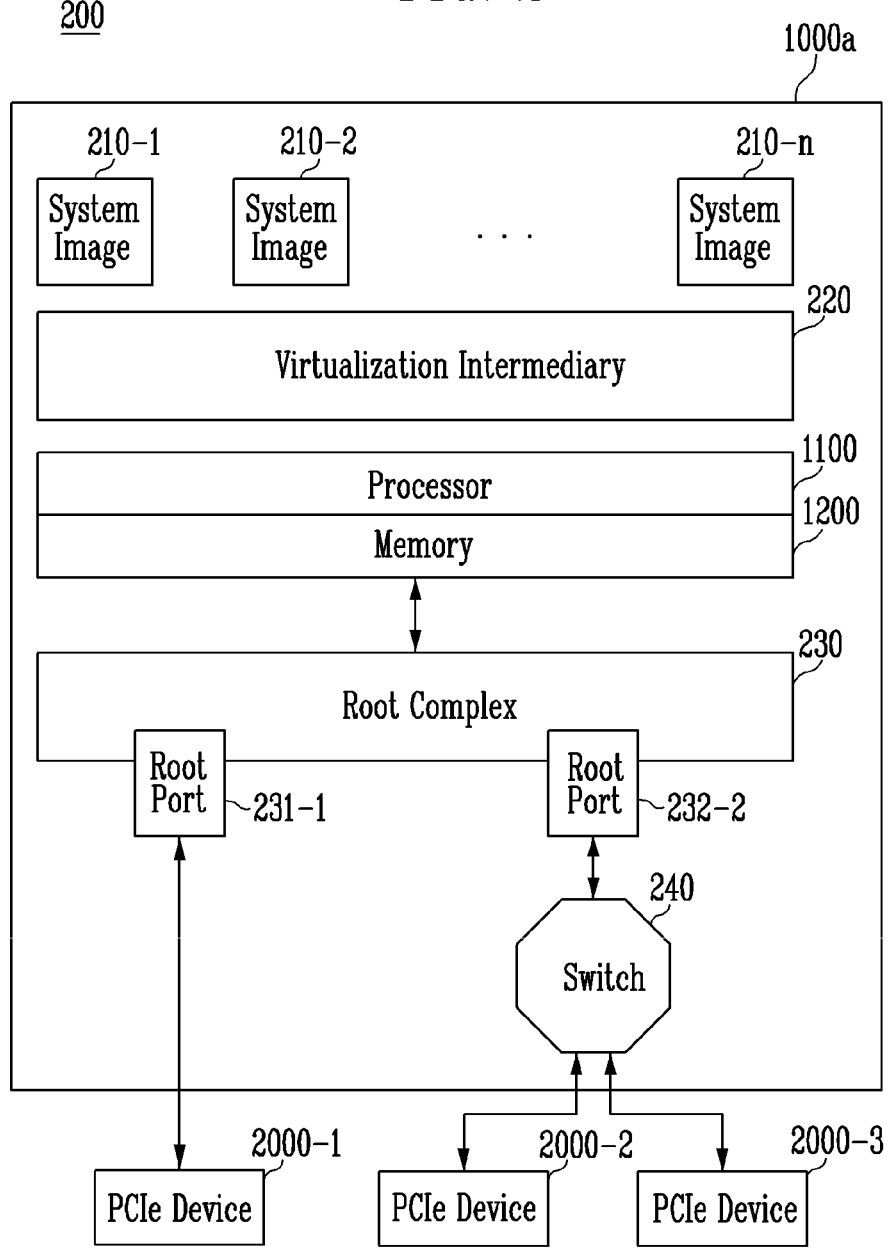
FIG. 2 illustrates another example of a computing system according to an embodiment of the present disclosure.

FIG. 2 illustrates another example (a computing system 200) of a computing system according to an embodiment of the present disclosure.

According to an embodiment, FIG. 2 shows an example of a general platform configuration where PCIe is available.

Referring to FIG. 2, the computing system 200 may include a host 1000*a* and a plurality of PCIe devices 2000-1 to 2000-3.

The host 1000*a* may further include a plurality of system images 210-1 to 210-*n*, a virtualization intermediary 220, a root complex 230, and a switch 240. In the embodiment as shown in FIG. 2, an overlapping description of the processor 1100 and the memory 1200 will be omitted since they have same configurations as shown in FIG. 1.

According to an embodiment, the plurality of PCIe devices 2000-1 to 2000-3 may indicate the PCIe device 2000 of FIG. 1.

The system images 210-1 to 210-*n* may refer to software components that are executed in a virtual system to which PCIe functions are assigned. According to an embodiment, the system images 210-1 to 210-*n* may be referred to as virtual machines. The system images 210-1 to 210-*n* may be software such as operating systems that are used to execute applications or reliable services. For example, the system images 210-1 to 210-*n* may each be respectively configured as a guest OS, a shared or non-shared I/O device driver, or the like. To increase effective hardware resource utilization without hardware modifications, the plurality of system images 210-1 to 210-*n* may be executed in the computing system 200.

According to an embodiment, a PCIe function may refer to an independent operation unit for providing physical resources included in the PCIe devices 2000-1 to 2000-3. In the present disclosure, a PCIe function and a "function" may refer to the same meaning.

The virtualization intermediary 220 may be a software component that supports one or more system images 210-1 to 210-*n*. According to an embodiment, the virtualization intermediary 220 may be referred to as hypervisor or a virtual machine monitor (VMM). The virtualization intermediary 220 may be interposed between hardware such as the processor 1100 and the memory 1200 and the system images 210-1 to 210-*n*. I/O operations (inbound or outbound) in the computing system 200 may be intercepted and processed by the virtualization intermediary 220. The virtualization intermediary 220 may present the abstract hardware resources to the system images 210-1 to 210-*n* with its own virtual system. The actual hardware resources available to each of the system images 210-1 to 210-*n* may vary depending on workload or customer-specific policies.

The root complex 230 may signify the root of an I/O hierarchy that connects the processor 1100/memory 1200 subsystem to an I/O. According to an embodiment, the root complex 230 may be implemented as one configuration of the I/O manager 1300 as shown in FIG. 1.

The computing system 200 may include at least one root complex 230. In addition, each root complex 230 may include one or more root ports 231-1 and 232-2. Each of the root ports 231-1 and 232-2 may show a separate hierarchy. The root complex 230 may communicate with the switch 240 or the PCIe devices 2000-1 to 2000-3 through the root ports 231-1 and 232-2.

The capability to route peer-to-peer transactions between hierarchy domains through the root complex 230 may be optional. A hierarchy domain may be composed of a single endpoint or a sub-hierarchy containing one or more switches and endpoints.

The root complex 230 may split a packet into smaller packets when routing peer-to-peer transactions between hierarchy domains. For example, the root complex 230 may a single packet having a 256-byte payload into two packets each having a 128-byte payload. However, the root complex 230 that supports peer-to-peer routing of vendor-defined messages may not split a vendor-defined message into smaller packets except at 128-byte boundaries (i.e., all resulting packets except the last packet must be an integral multiple of 128 bytes).

The root complex 230 may support generation of configuration requests as a requester. The root complex 230 may support the generation of I/O requests as a requester.

The root complex 230 may not support lock semantics as a completer. The root complex 230 may support generation of locked requests as a requester.

The switch 240 may be defined as a logical assembly of various virtual PCI-to-PCI bridges. The switch 240 may communicate with the PCIe devices 2000-2 and 2000-3.

The switch 240 may appear as configuration software with two or more logical PCI-to-PCI bridges.

The switch 240 may forward transactions using PCI bridge mechanisms. The switch 240 may forward all types of transaction layer packets (TLPs) between all port sets. The switch 240 may support locked requests.

The switch 240 may not be allowed to split a packet into smaller packets.

Arbitration between ingress ports of the switch 240 may be implemented using round robin or weighted round robin when contention occurs on the same virtual channel.

Endpoints may not appear in configuration software on the internal bus of the switch 240 as peers of the virtual PCI-to-PCI bridges representing the switch downstream ports.

Figure 3:
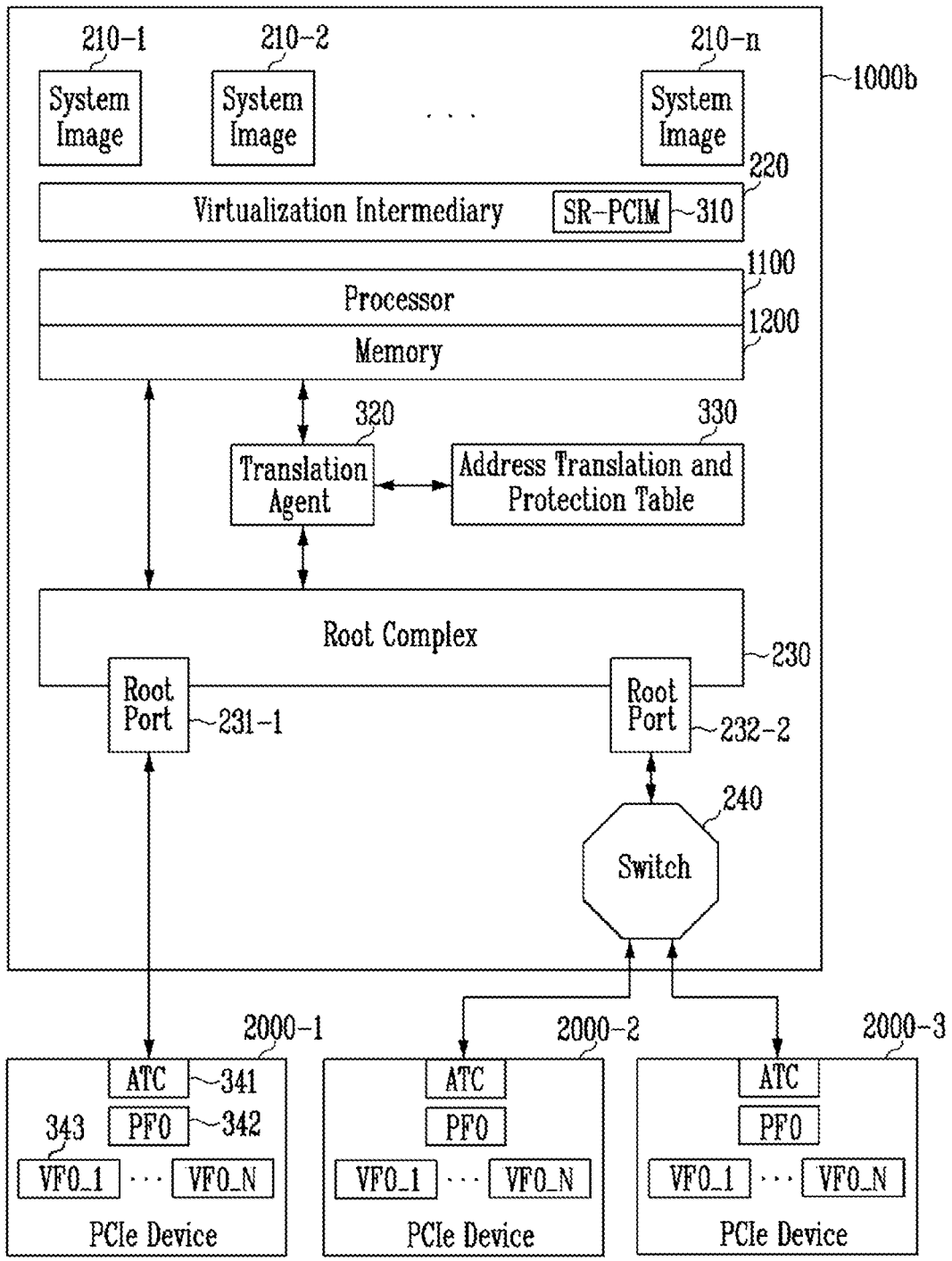
FIG. 3 illustrates another example of a computing system according to an embodiment of the present disclosure.

FIG. 3 illustrates another example (a computing system 300) of a computing system according to an embodiment of the present disclosure.

According to an embodiment, FIG. 3 shows an example of a Single Root input/output Virtualization (SR-IOV) configuration platform.

Single Root I/O Virtualization (SR-IOV) may enable the system images 210-1 to 210-n to share PCIe hardware resources in a virtual environment. According to an embodiment, SR-ION/may be developed to improve I/O performance of the PCIe devices 2000-1 to 2000-3 and directly connect the system images 210-1 to 210-n and the PCIe devices 2000-1 to 2000-3. Therefore, in the computing system 300 that contains SR-IOV capability, one or more PCIe devices 2000-1 to 2000-3 or PCIe functions may be assigned to one of the system images 210-1 to 210-n. According to an embodiment, the SR-ION/capability may have a specification that a single PCIe device (2000-1 to 2000-3) may appear as individual PCI devices 2000-1 to 2000-3 on the system image (210-1 to 210-n) under a single root port. According to an embodiment, the PCIe devices 2000-1 to 2000-3 supporting the SR-ION/capability may display a plurality of instances, i.e., PCIe functions on the system images 210-1 to 210-n. In addition, in the computing system 300 to which the SR-ION/capability is applied, the root complex 230 may directly connect the system images 210-1 to 210-n to the PCIe functions without the virtualization intermediary 220. Therefore, by using the SR-ION/ capability, the root complex 230 may directly connect the system images 210-1 to 210-n of the host 1000 to the PCIe functions not via the virtualization intermediary 220.

Referring to FIG. 3, the computing system 300 may include a host 1000b and the plurality of PCIe devices 2000-1 to 2000-3.

The host 1000b may include a single root PCI manager (SR-PCIM) 310, a translation agent (TA) 320, and an address translation and protection table (ATPT) 330. In the embodiment as shown in FIG. 3, an overlapping description of the processor 1100, the memory 1200, the plurality of system images 210-1 to 210-n, the virtualization intermediary 220, the root complex 230, and the switch 240 will be omitted since they have same configurations as those shown in FIG. 1.

According to an embodiment, the plurality of PCI devices 2000-1 to 2000-3 as shown in FIG. 3 may represent the plurality of PCIe devices 2000-1 to 2000-3 as shown in FIG. 2. Each of the PCIe devices 2000-1 to 2000-3 may include an address translation cache (ATC) 341, a physical function (PF) 342, and a plurality of virtual functions (VF0_1 to VF0_N) 343. For convenience of explanation, FIG. 3 illustrates one physical function. However, according to embodiments, there may be a plurality of physical functions.

The single root PCI manager 310 may include software responsible for the configuration of the SR-IOV capability, management of the physical functions 342 and the virtual functions 343, processing of associated error events, and overall device controls such as power management, and hot plug services. According to an embodiment, the single root PCI manager 310 may be logically located on a virtualization intermediary 220 layer.

The translation agent 320 may be hardware, or a combination of hardware and software responsible for translating an address within a PCIe transaction into an associated platform physical address. The translation agent 320 may include an address translation cache to accelerate translation table access. In addition, the translation agent 320 may support address translation services (ATS) which enables a PCIe function to obtain address translations a priori to DMA access to the associated memory. In am SR-IOV implementation, the use of the translation agent 320 may be optional.

The address translation and protection table 330 may contain the set of address translations accessed by the translation agent 320 to process PCIe requests (DMA read, DMA write or interrupt request). In PCIe, interrupts may be treated as memory write operations. Through a combination of a requester identifier and an address contained within a PCIe transaction, an interrupt may be routed to any target (e.g., a processor core) transparent to the associated I/O function. DMA read and write requests may be translated through a combination of a routing ID and the address contained within the PCIe transaction. The use of the address translation and protection table 330 may be optional in an SR-ION/implementation.

The address translation cache 341 may exist in two locations within a platform. For example, the address translation cache 341 may be integrated within the translation agent 320, located in an RC, or located in the PCIe devices 2000-1 to 2000-3. In the PCIe devices 2000-1 to 2000-3, the address translation cache 341 may be populated using the ATS technology. A PCIe transaction indicating that a translated address is contained may bypass the address translation cache 341 of a platform to improve performance without damaging advantages related to the address translation and protection table 330. The use of the address translation cache 341 may be optional in an SR-IOV implementation.

The physical function 342 may be a PCIe function that supports the SR-ION/capability and accesses the single root PCI manager 310, the virtualization intermediary 220 or the system images 210-1 to 210-n.

The virtual function 343 may be a light-weight PCIe function that may directly access the system images 210-1 to 210-n. The virtual function 343 may operate as a virtual instance of the physical function 342. Thus, from point-of-view of the system images 210-1 to 210-n, the virtual function 343 may appear as an instance of the physical function 342. Resources associated with a main data movement of a function may be used in the system images 210-1 to 210-n. The virtual function 343 may be shared serially by different system images 210-1 to 210-n. For example, the virtual function 343 may be assigned to one system image (210-1 to 210-n), reset, and then be assigned to another system image (210-1 to 210-n). The virtual function 343 may be selectively migrated from one physical function 342 to another physical function. All virtual functions 343 associated with the physical function 342 may be the same device type as the physical function 342 (e.g., the same network device type or the same storage device type).

Figure 4:
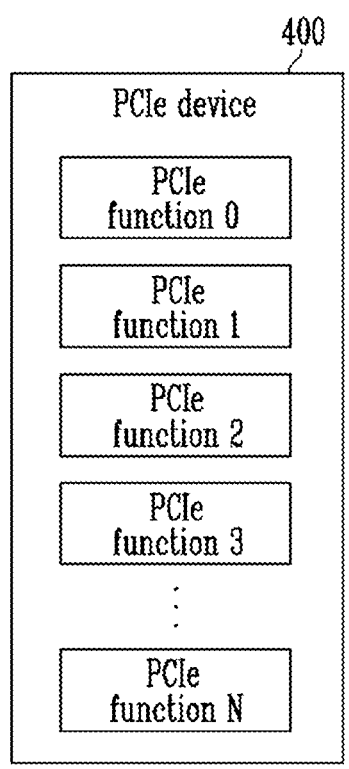
FIG. 4 illustrates a multi-function device according to an embodiment of the present disclosure.

FIG. 4 illustrates a multi-function device according to an embodiment of the present disclosure.

A PCIe device 400 as shown in FIG. 4 may represent one of the PCIe device 2000 as shown in FIG. 1 and the PCIe devices 2000-1 to 2000-3 as shown in FIGS. 2 and 3.

Referring to FIG. 4, the PCIe device 400 may include a plurality of PCIe functions PCIe function 0 to PCIe unction N. According to an embodiment, the plurality of PCIe functions PCIe function 0 to PCIe function N may be physical functions. When all PCIe functions PCIe function 0 to PCIe function N included in the PCIe device 400 are physical functions, the corresponding PCIe device 400 may be defined as a multi-function device.

According to an embodiment, the plurality of PCIe functions PCIe function 0 to PCIe function N may share a common PCIe link. The link and PCIe functionality shared by all PCIe functions PCIe function 0 to PCIe function N may be managed through the PCIe function 0.

According to an embodiment, the plurality of PCIe functions PCIe function 0 to PCIe function N may support the Alternative Routing Identifier (ARI) capability. In addition, the plurality of PCIe functions PCIe function 0 to PCIe function N may use a single bus number captured through a PCI enumeration process.

According to an embodiment, the plurality of PCIe functions PCIe function 0 to PCIe function N may support ATS capability. The plurality of PCIe functions PCIe function 0 to PCIe function N may include an address translation cache for manage ATS obtained translated addresses.

According to an embodiment, each of the plurality of PCIe functions PCIe function 0 to PCIe function N may include unique physical resources including a separate configuration space, a base address register (BAR), and the like. The physical resources may refer to some of the physical resources of the PCIe device 400. In other words, the plurality of PCIe functions PCIe function 0 to PCIe function N may provide physical resources to system images allocated thereto.

The plurality of PCIe functions PCIe function 0 to PCIe function N may be assigned to the system images, respectively. To prevent one system image from impacting another system image, all PCIe configuration operations may be intercepted and processed by the virtualization intermediary.

According to an embodiment, the configuration space of the plurality of PCIe functions PCIe function 0 to PCIe function N may include a type 0 configuration space header. For example, the type 0 configuration space header may include a header type register and an interrupt pin register.

The header type register may be included in the type 0 configuration space header of the configuration space. The header type register may identify whether multi-functions may be included in a layout of a predefined second portion (starting from a 10 h byte of the configuration space) and the PCIe device 400. For example, a multi-function device field of a header type register may be included. When the multi-function device field is set, the PCIe device 400 may include the plurality of PCIe functions PCIe function 0 to PCIe function N. Software may probe the other PCIe functions PCIe function 1 to PCIe function N except for the PCIe function 0.

The interrupt pin register may be a read-only register that identifies a legacy interrupt message the function uses. Valid values may be 01h, 02h, 03h and 04h that are mapped to the legacy interrupt message for INTA, INTB, INTC and INTD, respectively. The value 00h may indicate that the function does not use the legacy interrupt message. The values 05h to FFh may be reserved. The PCI Express may define one legacy interrupt message for a single function device and define up to four legacy interrupt messages for the multi-function device. For the single function device, only INTA may be used. The plurality of PCIe functions PCIe function 0 to PCIe function N of the multi-function device may use INTx messages. When a device implements a single legacy interrupt message, it should be INTA. When two legacy interrupt messages are implemented, it should be INTA and INTB. In terms of a multi-function device, the plurality of PCIe functions PCIe function 0 to PCIe function N may use the same INTx message, or each may have its own INTx messages (up to a maximum of four), or any combination thereof.

According to an embodiment, the configuration space of each of the plurality of PCIe functions PCIe function 0 to PCIe function N may be included in a PCIe capability structure. For example, the PCIe capability structure may include a PCIe capability register, a device capabilities register, a device control register, a device status register, a link capabilities register, a link control register, a link status register, a slot capabilities register, a slot control register, a slot status register, a root control register, a root capabilities register, a root status register, a device capabilities 2 register, a device control 2 register, a device status 2 register, a link capabilities 2 register, a link control 2 register, and a link status 2 register, a slot capabilities 2 register, a slot control 2 register, a slot status 2 register, a root controller 2 register, a root capabilities 2 register, a root status 2 register, and the like.

The PCIe capability register may identify a PCIe device function type and associated capabilities. According to an embodiment, the PCIe capability register may be a 16-bit register. The bits 3:0 of the PCIe capability register may a capability version field. The capability version field may have a read only attribute. More specifically, the capability version field may indicate a PCI-SIG defined PCI Express function structure version number.

The bits 7:4 of the PCIe capability register may be a device/port type field. The device/port type field may have a read only attribute. More specifically, the device/port type field may indicate a specific type of a function. In the device/port type field, functions of a multi-function device may refer to different types. The bit 8 of the PCIe capability register may be a slot implemented field. The slot implemented field may have a hardware initialized (HwInit) attribute. When the slot implemented field is set, it may mean that a link connected to this port is connected to a slot. The bits 13:9 of the PCIe capability register may be an interrupt message number field. The interrupt message number field may have a read only attribute. The interrupt message number field may indicate which MSI/MSI-X vector is used for an interrupt message generated in association with a status bit with a function structure. For MSI, a value of the interrupt message number field may indicate an offset between a base message data and the generated interrupt message. For MSI-X, the value of the interrupt message number field may indicate an MSI-X table entry used to generate the interrupt message. When both MSI and MSI-X are implemented, MSI and MSI-X may be permitted to use different vectors though software must enable only one mechanism at a time. For example, when MSI-X is enabled, the value of the interrupt message number field may indicate an MSI-X vector. When MSI is enabled, or none of MSI and MSI-X is enabled, the value of the interrupt message number field may indicate a vector for MSI. When both MSI and MSI-X are enabled at the same time, the value in the interrupt message number field may not be defined. The bit 14 of the PCIe capability register may have a read only attribute and may not be defined.

The device capability register may identify PCIe device function-specific capabilities. According to an embodiment, the device capability register may be a 32-bit register. The bits 2:0 of the device capability register may be a maximum payload size supported (Max_Payload_Size Supported)

field. The max payload size supported field may have a read only attribute. The max payload size supported field may indicate a maximum payload size that supports TLP. The PCIe functions PCIe function 0 to PCIe function N of the multi-function device may have different values for this field. The bits 4:3 of the device capability register may be a phantom functions supported field. The phantom functions supported field may have a read only attribute. The phantom functions supported field may indicate the support for use of unclaimed function numbers to extend the number of outstanding transactions allowed by logically combining the unclaimed functions numbers with a tag identifier.

The device control register may control a PCIe device-specific parameter. According to an embodiment, the device control register may be a 16-bit register. The bit 0 of the device control register may be a correctable error reporting enable field. The correctable error reporting enable field may control sending ERR_COR messages in conjunction with other bits. For the multi-function device, the correctable error reporting enable field may control error reporting of each PCIe function (PCIe function 0 to PCIe function N). The correctable error reporting enable field may have a read-write (RW) attribute. The bit 1 of the device control register may be a non-fatal correctable error reporting enable field. The non-fatal correctable error reporting enable field may control sending ERR_NONFATAL messages in conjunction with other bits. For the multi-function device, the non-fatal error reporting enable field may control error reporting of each PCIe function (PCIe function 0 to PCIe function N) from point-of-view of each PCIe function (PCIe function 0 to PCIe function N). The non-fatal error reporting enable field may have a read-write attribute. The bit 2 of the device control register may be a fatal error reporting enable field. The fatal error reporting enable field may control sending ERR_FATAL messages in conjunction with other bits. For the multi-function device, the fatal error reporting enable field may control error reporting of each PCIe function (PCIe function 0 to PCIe function N) from point-of-view of each PCIe function (PCIe function 0 to PCIe function N). The fatal error reporting enable field may have a read-write attribute. The bit 3 of the device control register may be an unsupported request reporting enable field. The unsupported request reporting enable field may control signaling of unsupported request errors by sending error messages in conjunction with other bits. For the multi-function device, the unsupported request reporting enable field may control error reporting of each PCIe function (PCIe function 0 to PCIe function N) from point-of-view of each PCIe function (PCIe function 0 to PCIe function N). The unsupported request reporting enable field may have a read-write attribute. The bits 7:5 of the device control register may be a maximum payload size (Max_Payload_Size) field. The max payload size field may set the maximum TLP payload size for a function. As a receiver, a function must not generate TLPs exceeding a set value. As a transmitter, permissible values may be indicated by the max payload size supported field of the function capability register. All PCIe functions PCIe function 0 to PCIe function N of the multi-function device may have different values in the max payload size field. For ARI devices, the max payload size field may be determined solely by the setting in the PCIe function 0. The settings in the other functions may always return whatever values software programmed for each, but otherwise may be ignored by components. The max payload size field may have a read-write attribute.

The device status register may provide information about a PCIe device (function)-specific parameter. According to an embodiment, the device status register may be a 16-bit register. The bit 0 of the device status register may be a correctable error detected field. The correctable error detected field may indicate that correctable errors are detected. The correctable errors may be recorded in the correctable error detected field regardless of whether error reporting is enabled in the device control register. For a multi-function device, each PCIe function (PCIe function 0 to PCIe function N) may represent an error status that is perceived by each PCIe function (PCIe function 0 to PCIe function N). The correctable error detected field may have a Write-1-to-clear status (RW1C) attribute. The bit 1 of the device status register may be a non-fatal correctable error detected field. The non-fatal correctable error detected field may indicate that non-fatal errors are detected. The non-fatal errors may be recorded in the non-fatal error detected field regardless of whether error reporting is enabled in the device control register. For a multi-function device, each PCIe function (PCIe function 0 to PCIe function N) may indicate an error status that is perceived by each PCIe function (PCIe function 0 to PCIe function N). A non-fatal error detected field may have an RW1C attribute. The bit 2 of the device status register may be a fatal error detected field.

The fatal error detected field may indicate status of fatal errors detected. The fatal errors may be recorded in the fatal error detected field regardless of whether error reporting is enabled or not in the device control register. For a multi-function device, each PCIe function (PCIe function 0 to PCIe function N) may indicate an error status that is perceived by each PCIe function (PCIe function 0 to PCIe function N). A fatal error detected field may have an RW1C attribute. The bit 3 of the device status register may be an unsupported request field. The unsupported request detected field may indicate that a function has received unsupported requests. Errors may be recorded in the unsupported request detected field regardless of whether error reporting is enabled in the device control register. For a multi-function device, each PCIe function (PCIe function 0 to PCIe function N) may indicate an error status that is perceived by each PCIe function (PCIe function 0 to PCIe function N). The unsupported request detected field may have an RW1C attribute. The bit 6 of the device status register is an emergency power reduction detected field which may be set when the PCIe functions PCIe function 0 to PCIe function N enter emergency power reduction state. Each time a condition for which an emergency power reduction state is input exists, the PCIe functions PCIe function 0 to PCIe function N may maintain the emergency power reduction state. The multi-function device coupled to an upstream port may set the emergency power reduction detected field in all PCIe functions PCIe function 0 to PCIe function N that support the emergency power reduction state. The emergency power reduction detected field may have an RW1C attribute.

The link capability register may identify PCIe link-specific capability. For a multi-function device, field values of the link capability register of all PCIe functions PCIe function 0 to PCIe function N may be the same.

According to an embodiment, the configuration space of the plurality of PCIe functions PCIe function 0 to PCIe function N may include Message Signaled Interrupt (MSI) Capability Structures, Secondary PCI Express Extended Capability, Data Link Feature Extended Capability, and ACS Extended Capability. All PCIe functions PCIe function 0 to PCIe function N that generate interrupts may implement MSI or MSI-X.

In addition, the configuration space of the plurality of PCIe functions PCIe function 0 to PCIe function N may include various registers associated with the multi-function device in addition to the above-described registers.

According to an embodiment, the plurality of PCIe functions PCIe function 0 to PCIe function N may perform an error handling operation. For example, the plurality of PCIe functions PCIe function 0 to PCIe function N may perform an error handling operation using advanced error reporting (AER). For example, when an error is detected, the plurality of PCIe functions PCIe function 0 to PCIe function N may perform an error handling operation by indicating an error status through a completion status field, by sending an error message to a root complex, or by error forwarding.

According to an embodiment, the plurality of PCIe functions PCIe function 0 to PCIe function N may perform a function level reset (FLR) operation. For example, the plurality of PCIe functions PCIe function 0 to PCIe function N may perform a function level reset (FLR) operation at the request of a host.

A function level reset mechanism may enable software to quiesce and reset endpoint hardware with function-level granularity.

The function level reset may apply to each of the PCIe functions PCIe function 0 to PCIe function N. Only the target PCIe function (PCIe function 0 to PCIe function N) may be affected by the function level reset operation. The link status may not be affected by the function level reset.

The function level reset may modify the status of each of the PCIe functions PCIe function 0 to PCIe function N.

For example, except for sticky-type registers (ROS, RWS, RW1CS), HwInit type defined registers, and other such fields or registers, function registers and function-specific state machines may be set to initial values of function registers and function-specific state machines.

In addition, function level reset (FLR) may modify function states such as a captured slot power limit value of a device capability register, a captured slot power limit scale of the device capability register, Max_Payload_Size of a device control register, Active State Power Management (ASPM) control of a link control register, a Read Completion Boundary (RCB) of the link control register, Common Clock Configuration of the link control register, Extended Synch of the link control register, Enable Clock Power Management of the link control register, Hardware Autonomous Width Disable of the link control register, Hardware Autonomous Speed Disable of a link control 2 register, a Link Equalization 8.0 GT/s request of a link state 2 register, a link equalization request 16.0 GT/s of a 16.0 GT/s state register, a Lane Equalization Control register of a Secondary PCI Express Extended Capability structure, a 16.0 GT/s Lane Equalization Control register of a Physical Layer 16.0 GT/s Extended Capability structure, a Virtual Channel Capability structure of all registers, all registers of a Multi-Function Virtual Channel Capability structure, all registers of a Data Link Feature Extended Capability structure, all registers of a Physical Layer 16.0 GT/s Extended Capability structure, and all registers of Lane Margining of a Receiver Extended Capability structure.

Controls that enable the PCIe functions PCIe function 0 to PCIe function N to initiate requests on PCI express may be cleared, including Bus Master Enable, MSI interrupt enable, and the like, effectively causing the PCIe functions PCIe function 0 to PCIe function N to become quiescent on the link.

Port state machines associated with link functionality including those in the physical and data link layers may not be reset by FLR, and VCO may remain initialized following an FLR. Any outstanding INTx interrupt asserted by the PCIe functions PCIe function 0 to PCIe function N may be deasserted by sending the corresponding Deassert_INTx Message prior to starting the FLR.

When the FLR is initiated to the PCIe functions PCIe function 0 to PCIe function N of the PCIe device 400, if another PCIe function continues to assert a matching INTx, no Deassert_INTx Message will be transmitted.

After an FLR has been initiated by writing a 1b to the Initiate Function Level Reset bit, the PCIe functions PCIe function 0 to PCIe function N must complete the FLR within 100 ms. If software initiates an FLR when the transactions pending bit is 1b, then software must not initialize the PCIe functions PCIe function 0 to PCIe function N until allowing adequate time for any associated Completions to arrive, or to achieve reasonable certainty that any remaining completions will never arrive. Thus, the computing system may allow as much time as provided by the pre-FLR value for Completion Timeout. If completion timeouts are disabled on the PCIe functions PCIe function 0 to PCIe function N when the FLR is issued, then the delay may be system dependent but may be 100 ms or more. When a function ready status is implemented, a computing system may issue a configuration request to the PCIe functions PCIe function 0 to PCIe function N right after receiving a function level rest message indicating that it is completely prepared for configuration.

Upon receipt of an FLR, the PCIe functions PCIe function 0 to PCIe function N may either clear all transaction statuses including transactions pending, or may set the completion Timeout to its default value so that all pending transactions may time out during FLR execution. The transactions pending bit may be clear upon completion of the FLR.

Since FLR modifies function state, the behavior of the FLR may be specified using a set of criteria that, when applied to the PCIe functions PCIe function 0 to PCIe function N, show that the PCIe functions PCIe function 0 to PCIe function N have them. The following criteria must be applied using function-specific knowledge to evaluate the PCIe functions PCIe function 0 to PCIe function N's behavior in response to an FLR.

The PCIe function (PCIe function 0 to PCIe function N) may not give the appearance of an initialized adapter with an active host on any external interfaces controlled by the corresponding function (PCIe function 0 to PCIe function N). The steps needed to terminate activity on the external interfaces may be exceptional. For example, a network adapter may not respond to queries that would require adapter initialization by the host system or interaction with an active host system, but may be permitted to perform an action that is designed to be performed without host initialization or interaction. When the network adapter include multiple PCIe functions PCIe function 0 to PCIe function N that operate on the same external network interface, this rule may affect only those aspects associated with particular function reset by the FLR.

The PCIe functions PCIe function 0 to PCIe function N may not retain within itself software readable state that potentially includes secret information associated with any preceding use of the PCIe functions PCIe function 0 to PCIe function N. Main host memory assigned to the PCIe functions PCIe function 0 to PCIe function N may not be modified by the PCIe functions PCIe function 0 to PCIe function N. For example, a PCIe function (PCIe function 0 to PCIe function N) with internal memory readable directly or indirectly by host software may clear or randomize that memory.

The PCIe function (PCIe function 0 to PCIe function N) may return to a state such that normal configuration of the PCIe function (PCIe function 0 to PCIe function N)'s PCI Express interface may cause it to be useable by drivers normally associated with the PCIe functions PCIe function 0 to PCIe function N.

When an FLR is initiated, the targeted PCIe functions PCIe function 0 to PCIe function N must behave as follows:

The PCIe functions PCIe function 0 to PCIe function N may return the completion for the configuration write that initiates the FLR operation, and may then initiate the FLR.

While the FLR is in progress, when a request for PCIe functions PCIe function 0 to PCIe function N arrives, the request may be permitted to be silently discarded (following update of flow control credits) without logging or signaling it as an error. In addition, if a completion arrives, the completion may be permitted to be handled as an unexpected completion or to be silently discarded without logging or signaling it as an error.

When the PCIe function (PCIe function 0 to PCIe function N) is required to complete the FLR operation within a time limit, a subsequent function-specific initialization sequence may require an additional time. When the additional time is required, the PCIe function (PCIe function 0 to PCIe function N) may return a configuration request retry status (CRS) completion status when a configuration request is received after the time limit. After the PCIe function (PCIe function 0 to PCIe function N) responds to the configuration request with a completion status other than CRS, it may not be permitted to return the CRS until it is reset again.

Figure 5:
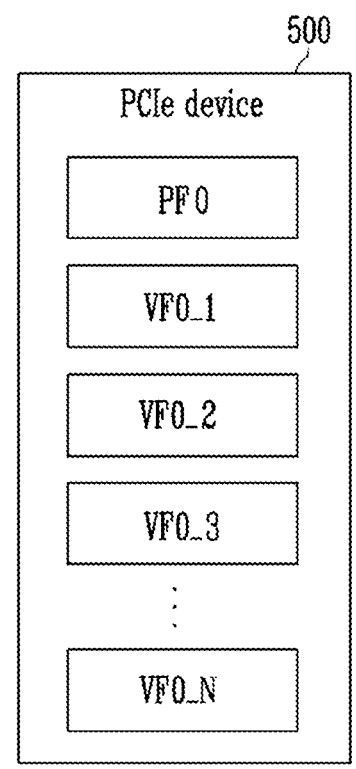
FIG. 5 illustrates an example of a PCIe device that is single root input/output virtualization (SR-IOV) capable according to an embodiment of the present disclosure.

FIG. 5 illustrates an example of a single root input/output virtualization (SR-IOV) capable PCIe device 500 according to an embodiment of the present disclosure.

The PCIe device 500 as shown in FIG. 5 may represent one of the PCIe device 2000 as shown in FIG. 1 and the PCIe devices 2000-1 to 2000-3 as shown in FIGS. 2 and 3.

For example, FIG. 5 may represent the PCIe device 500 to which SR-IOV capability is applied.

Referring to FIG. 5, the PCIe device 500 may include a physical function PF0 and a plurality of virtual functions VF0_1 to VF0_N associated with the physical function 0 PF0. The virtual function VF0_1 may refer to a first virtual function that is associated with the physical function 0 PF0. In the same manner, the virtual function VF0_N may refer to an Nth virtual function that is associated with the physical function 0 PF0. According to an embodiment, the configuration space, the register setting process, the error handling operation, and the function level reset operation as described above with reference to FIG. 4 may apply to the PCIe function PF0.

The physical function 0 PF0 may support SR-IOV capability. According to an embodiment, after a reset operation, the physical function 0 PF0 may disable the SR-ION/ capability. To discover the page sizes supported by the physical function 0 PF0, and the plurality of virtual functions VF0_1 to VF0_N, Supported Page Sizes configuration field may be read.

The plurality of virtual functions VF0_1 to VF0_N may share a plurality of common configuration space fields with the physical function PF0. Sharing may reduce the hardware resource requirements to implement the plurality of virtual functions VF0_1 to VF0_N. For example, the plurality of virtual functions VF0_1 to VF0_N may use the same configuration mechanisms and header types as the physical function 0 PF0. In addition, the plurality of virtual functions VF0_1 to VF0_N may share a VF BAR set. In addition, the plurality of virtual functions VF0_1 to VF0_N may share a VF memory space enable (MSE) bit that controls access to VF memory space. In other words, when the VF MSE bit is cleared, the memory mapped space allocated for all virtual functions VF0_1 to VF0_N may be disabled.

The InitialVFs and TotalVFs fields included in the SR-IOV capability may be used to discover the maximum number of virtual functions that may be associated with the physical function 0 PF0. For example, when the PCIe device 500 does not support VF migration, TotalVFs and InitialVFs may contain the same value. On the other hand, when the PCIe device 500 supports VF migration, if TotalVFs is read, the physical function 0 PF0 may return the number of virtual functions that may be assigned to the physical function 0 PF0. In addition, when InitialVFs is read, the physical function 0 PF0 may return the initial number of virtual functions assigned to the physical function 0 PF0.

The physical function 0 PF0 and the plurality of virtual functions VF0_1 to VF0_N may be assigned unique routing IDs. The Routing ID for each virtual function (VF0_1 to VF0_N) may be determined using the routing ID of the physical function 0 PF0 and fields included in the SR-IOV capability of the physical function 0 PF0.

All PCIe and SR-IOV configuration access may be carried out through a trusted software component such as a virtualization intermediary or a single root PCI manager.

According to an embodiment, the physical function 0 PF0 and the plurality of virtual functions VF0_1 to VF0_N may contain physical resources including configuration space. Each virtual function (VF0_1 to VF0_N) may contain a non-shared set of physical resources required to deliver Function-specific services, e.g., resources such as work queues, data buffers, etc. These resources may be directly accessed by a system image without requiring intervention of the virtualization intermediary or the single root PCI manager.

One or more virtual functions VF0_1 to VF0_N may be assigned to each system image. The physical function 0 PF0 and the plurality of virtual functions VF0_1 to VF0_N may include ATC.

According to an embodiment, the physical function 0 PF0 may be used to manage device-specific functionality such as internal resource allocation to each virtual function (VF0_1 to VF0_N), VF arbitration to shared resources such as the PCIe Link or the Function-specific Link (e.g., a network or storage Link), etc.

According to an embodiment, the configuration space of the physical function 0 PF0 may include the SR-IOV extended capability. For example, the SR-ION/extended capability may include an SR-ION/Extended Capability Header register, an SR-IOV Capabilities register, an SR-ION/Control register, an SR-ION/Status register, an InitialVFs register, a TotalVFs register, a NumVFs register, a Function Dependency Link register, a First VF Offset register, a VF Stride register, a VF Device ID register, a Supported Page Sizes register, a System Page Size register, a VF BAR0, VF BAR1, . . . , a VF BAR5 register, a VF Migration State Array Offset register.

The SR-IVO control register may include a virtual function (VF) enable field.

Virtual function enable may manage the assignment of the plurality of virtual functions VF0_1 to VF0_N with respect to the associated physical function 0 PF0. When the virtual function Enable is set, the plurality of virtual functions VF0_1 to VF0_N associated with the physical function 0 PF0 may be accessible in the PCI Express fabric. When the virtual function enable is set, the virtual functions VF0_1 to VF0_N may respond to and issue PCI Express transactions following rules for PCI Express Endpoint Functions.

When the virtual function enable is clear, the plurality of virtual functions VF0_1 to VF0_N may be disabled and may not be visible in the PCI Express fabric. Requests to these virtual functions VF0_1 to VF0_N may receive Unsupported Request (UR) and may not issue PCI Express transactions.

To allow components to perform internal initialization, after changing the virtual function enable bit from 0 to 1, the system may not be permitted to issue requests to the virtual functions VF0_1 to VF0_N which are enabled by the corresponding VF Enable bit until one of the following is true: at least 100 ms has passed; an FRS message has been received from the physical function 0 PF0 with a reason code of the virtual function Enabled; and at least VF Enable time has passed. The VF Enable time may be either a reset time value in the readiness time reporting capability associated with the virtual functions VF0_1 to VF0_N, or a value determined by system software/firmware.

The root complex and/or system software may allow at least 1.0 seconds after setting the VF Enable bit, before it may determine that the virtual function (VF0_1 to VF0_N) which fails to return a successful completion status for a valid configuration request is broken. After setting the VF Enable bit, the virtual functions VF0_1 to VF0_N enabled by the corresponding VF Enable bit may be permitted to return a CRS status to configuration requests up to the 1.0 s limit, when they are not ready to provide a successful completion status for a valid configuration request. After the physical function 0 PF0 transmits an FRS Message with a reason code of VF Enabled, no virtual functions VF0_1 to VF0_N associated with the corresponding physical function 0 PF0 is permitted to return CRS without an intervening VF disable or other valid reset conditions. After returning a successful completion to any request, the virtual functions VF0_1 to VF0_N may not be permitted to return CRS without an intervening VF disable or other valid reset conditions.

Since the virtual functions VF0_1 to VF0_N do not have an MSE bit (MSE in the virtual functions VF0_1 to VF0_N is controlled by the VF MSE bit in the SR-IOV capability in the physical function 0 PF0), it may be possible for software to issue a memory request before the virtual function (VF0_1 to VF0_N) is ready to handle the MSE bit. Therefore, Memory Requests may not be issued to the virtual functions VF0_1 to VF0_N until at least one of the following conditions has been met:

The virtual function (VF0_1 to VF0_N) has responded successfully to a Configuration Request. (CRS is not returned).

After issuing an FLR to the VF, at least one of the following is true: (1) at least 1.0 s has passed since the FLR was issued, (2) the virtual functions VF0_1 to VF0_N support Function Readiness Status and, after the FLR is issued, an FRS Message from the virtual functions VF0_1 to VF0_N with a reason code for FLR Completed has been received, or (3) at least FLR time has passed since the FLR is issued. FLR Time may be the FLR Time value in the Readiness Time Reporting capability associated with the virtual functions VF0_1 to VF0_N or a value determined by system software/firmware.

After setting VF Enable in the physical function PF0, at least one of the following is true: (1) at least 1.0 s has passed since the VF Enable was set, (2) the physical function 0 PF0 supports Function Readiness Status and, after VF Enable is set, an FRS message from the physical function 0 PF0 with the reason code for the virtual function enabled has been received, or (3) minimum virtual function enable time has passed after the virtual function Enable is set. The virtual function enable time may be a reset time value in the Readiness Time Reporting capability associated with the virtual functions VF0_1 to VF0_N or a value determined by system software/firmware.

The virtual functions VF0_1 to VF0_N may be permitted to silently drop memory requests after an FLR is issued to the virtual functions VF0_1 to VF0_N or VF Enable has been set in the associated physical function 0 PF0 in the SR-IOV capability until the virtual functions VF0_1 to VF0_N respond successfully (without returning CRS) to any request.

Clearing VF Enable may effectively destroy the virtual functions VF0_1 to VF0_N. Setting VF Enable may effectively create the virtual functions VF0_1 to VF0_N. Setting VF Enable after it has previously been cleared may result in a new set of virtual functions VF0_1 to VF0_N. When the physical function 0 PF0 is in a D0 power state, the new virtual functions VF0_1 to VF0_N may be in the $D0_{uninitialized}$ state. If the physical function 0 PF0 is in a lower power state, a behavior may be undefined When VF Enable is clear, the physical function PF0 that supports FRS may send an FRS Message with FRS Reason of VF Disabled to indicate when this operation has been completed. The physical function 0 PF0 may not be permitted to send this message when there are outstanding non-posted requests issued by the physical function 0 PF0 or any of the virtual functions VF0_1 to VF0_N associated with the physical function 0 PF0. The FRS message may only be sent after these requests have been completed (or timed out).

When software clears VF Enable, no field in the SR-IOV Extended Capability or the VF Migration State Array may be accessed until either:

At least 1.0 s has elapsed after VF Enable was cleared, or

The physical function 0 PF0 supports FRS and after VF enable was cleared, an FRS Message has been received from the physical function 0 PF0 with a reason code of VF Disabled.

InitialVFs registers may indicate to SR-PCIM the number of virtual functions VF0_1 to VF0_N that are initially associated with the physical function 0 PF0.

TotalVFs registers may indicate the maximum number of virtual functions VF0_1 to VF0_N that may be associated with the physical function 0 PF0.

NumVFs registers may control the number of virtual functions VF0_1 to VF0_N that are visible.

Virtual function base address registers may define base address registers (BARs) of the virtual functions VF0_1 to VF0_N. When the virtual function base address register is written with an actual address value, and VF Enable and VF MSE are set, the BAR may map Num VFs BARs.

According to an embodiment, the configuration space of the physical function 0 PF0 and the virtual functions VF0_1 to VF0_N may include a type 0 configuration space header, a PCIe capability register, a PCI standard capability register, a PCIe extended capability register, and the like.

According to an embodiment, register field values included in the configuration space of the virtual functions VF0_1 to VF0_N may be subordinate to or independent from register field values included in the configuration space of the physical function 0 PF0. For example, the register field values included in the configuration space of the virtual functions VF0_1 to VF0_N may have a value of 0 (zero) when they are subordinate to the register field values included in the configuration space of the physical function 0 PF0. The virtual functions VF0_1 to VF0_N may perform a configuration operation according to the register field values of the associated physical function 0 PF0.

According to an embodiment, the plurality of PCIe functions PCIe function 0 to PCIe function N may perform an error handling operation. For example, when the physical function 0 PF0 handles an error using advanced error reporting, the virtual functions VF0_1 to VF0_N may also handle an error using advanced error reporting.

According to an embodiment, the plurality of PCIe functions PCIe function 0 to PCIe function N may perform a reset operation.

For example, the virtual functions VF0_1 to VF0_N may complete internal initialization when one of the following occurs:

The virtual function (VF0_1 to VF0_N) has responded successfully to a configuration request (CRS is not returned).

After issuing a function level reset to the virtual functions VF0_1 to VF0_N, one of the following is true: (1) at least 1.0 s has passed, (2) an FRS message from the virtual functions VF0_1 to VF0_N with a reason code FLR completed has been received, or (3) minimum FLR time has passed. The function level reset time may be a function level reset time value in the Readiness Time Reporting capability associated with the virtual functions VF0_1 to VF0_N or a value determined by system software/firmware.

After setting VF Enable in the physical function 0 PF0, at least one of the following may be true: (1) at least 1.0 s has passed since VF Enabled was set, or (2) after VF Enabled was set, an FRS Message has been received from the physical function 0 PF0 with a reason code of VF enabled.

In a virtualization environment consisting of a plurality of system images, an operating system (OS) kill & reboot operation of a specific system image may not affect operations of another system image. However, when the specific system image accesses a PCIe function assigned to another system image, this may cause errors in another system image.

Therefore, a computing system 300 having an SR-IOV configuration that uses the virtual function as shown in FIG. 3 may be used in some platforms. In the computing system 300 having the SR-IOV configuration, a virtual address may be used to access the PCIe function. Therefore, the specific system image may not be able to access the PCIe function assigned to another system image. However, in the computing system 300 having the SR-IOV configuration, software or hardware such as the translation agent 320 for translating a virtual address into a physical address may be required. In addition, the performance of the computing system 300 may be degraded due to address translation.

The computing system 200 consisting of the multi-function devices as shown in FIG. 2 may not require an address translation operation since physical addresses are used. However, since the computing system 200 consisting of the multi-function devices does not use virtual addresses, the specific system image may access another system image. As a result, the computing system 200 may have weak security.

Therefore, there is a demand for technologies that strengthen the weak security of the multi-function device and improving the performance of the computing system 200.

FIG. 6 illustrates a PCIe function 600 according to an embodiment of the present disclosure.

The host 1000a, the plurality of system images 210-1 to 210-n, and the root complex 230 as shown in FIG. 6 may indicate the host 1000a, the plurality of system images 210-1 to 210-n, and the root complex 230 as shown in FIG. 2, respectively. In an embodiment, the system images 201-1 to 201-n are virtual machines that may be system virtual machines or process virtual machines.

Referring to FIG. 6, the PCIe function 600 may be assigned to one of the plurality of system images 210-1 to 210-n. In FIG. 6, it may be assumed that the PCIe function 600 is assigned to a system image 210-i.

According to an embodiment, the PCIe function 600 may be one of various functions to which a PCIe interface is applicable, such as a physical function, a virtual function, a base function, and the like. A base function may be a PCIe function that is used in a virtualization environment using Multi Root I/O Virtualization (MR-IOV). MR-IOV may correspond to a technique for allowing the system images 210-1 to 210-n to share PCIe hardware resources in a virtualization environment including a plurality of virtual hierarchies. Each of the virtual hierarchies may include at least one physical function. In addition, each of the virtual hierarchies may further include at least one virtual function assigned to a physical function. According to an embodiment, a base function may be a PCIe function that supports the MR-IOV capability. In a virtualization environment including a plurality of root complexes, the MR-IOV capability may have specifications that allow a single PCIe device to be indicated as a plurality of PCIe devices on the system images 210-1 to 210-n. For example, the base function may manage a virtual hierarchy and a physical function according to the MR-IOV capability and assign a virtual function to the virtual hierarchy.

According to an embodiment, the PCIe function 600 may include an access identification information controller 610, a data packet receiver 620, and an access allowance determiner 630.

The access identification information controller 610 may generate access identification information ACCESS_ID. The access identification information ACCESS_ID may be information for allowing an access to the PCIe function 600. In other words, the access identification information ACCESS_ID may be used by the assigned system image 210-i to access the PCIe function 600. Therefore, each of a plurality of PCIe functions PCIe function 0 to PCIe function N (such as those shown in FIGS. 3 through 5) may generate unique access identification information ACCESS_ID. Each of the system images 210-1 to 210-n may receive the unique access identification information ACCESS_ID from each of the plurality of PCIe functions PCIe function 0 to PCIe function N.

According to an embodiment, the access identification information ACCESS_ID may be generated by either the access identification information controller 610 or the host 1000a. FIG. describes an example in which the access identification information ACCESS_ID is generated by the access identification information controller 610. An example in which the access identification information ACCESS_ID is generated by the host 1000a will be described below with reference to FIGS. 12 and 13.

In addition, the access identification information controller 610 may store the access identification information ACCESS_ID and provide the assigned system image 210-*i* with the access identification information ACCESS_ID. For example, the access identification information controller 610 may provide the root complex 230 with the access identification information ACCESS_ID. The root complex 230 may transmit the provided access identification information ACCESS_ID to the system image 210-*i*. The system image 210-*i* may store the transferred access identification information ACCESS_ID.

The data packet receiver 620 may receive a data packet from the target system image 210-*i* among the plurality of system images 210-1 to 210-*n*. In the present disclosure, the target system image 210-*i* may be defined as the system image 210-*i* that transfers the data packet to the PCIe function 600.

According to an embodiment, a data packet may include target identification information. For example, a prefix of the data packet may include target identification information. The target identification information may indicate the target system image 210-*i*. In other words, the target system image 210-*i* may receive and store the target identification information based on access identification information received from the allocated PCIe function 600.

According to an embodiment, a data packet may be a transaction layer packet TLP. The target system image 210-*i* may transfer the transaction layer packet TLP including target identification information to the PCIe function 600 to access. For example, the target system image 210-*i* may transfer the transaction layer packet TLP to the PCIe function 600 through the root complex. The target identification information may be included in a prefix of the transaction layer packet TLP. The data packet receiver 620 may receive the transaction layer packet TLP from the target system image 210-*i*. Thereafter, the data packet receiver 620 may provide the transaction layer packet TLP to the access allowance determiner 630.

The access allowance determiner 630 may determine whether or not to allow an access to the target system image 210-*i* based on the access identification information ACCESS_ID and the target identification information. For example, the access allowance determiner 630 may receive the access identification information ACCESS_ID from the access identification information controller 610 and obtain the target identification information from the transaction layer packet TLP. The access allowance determiner 630 may compare the access identification information ACCESS_ID with the target identification information and determine whether or not to allow the access of the target system image 210-*i* based on the comparison result.

For example, the access allowance determiner 630 may permit the access of the target system image 210-*i* when the access identification information ACCESS_ID and the target identification information coincide with each other.

In another example, the access allowance determiner 630 may not permit the access of the target system image 210-*i* when the access identification information ACCESS_ID and the target identification information do not coincide with each other. For example, when the transaction layer packet TLP is received from another system image, not from the system image 210-*i* to which the PCIe function 600 is allocated, the access identification information ACCESS_ID and the target identification information may not coincide with each other. The access allowance determiner 630 may discard the received transaction layer packet TLP and provide completer abort (CA) information to the target system image.

Therefore, according to an embodiment, by determining whether or not to allow an access based on target identification information included in a prefix of a data packet and access identification information stored in a PCIe function, security of the computing system 200 including the PCIe function may be strengthened.

FIG. 7 illustrates the structure of a transaction layer packet 700 according to an embodiment of the present disclosure.

According to an embodiment, the transaction layer packet 700 may be a data packet used to perform communication in the PCIe interface. For example, a requester may provide a completer with a request by using the transaction layer packet 700. The requester may represent a configuration for issuing a request and the completer may be a configuration providing a completion corresponding to the request.

Referring to FIG. 7, the transaction layer packet 700 may include a prefix PREFIX, a header HEADER, a data payload DATA PAYLOAD, and a digest DIGEST.

The prefix PREFIX precedes the header HEADER and may include additional information. According to an embodiment, the prefix PREFIX may include the access identification information ACCESS_ID. For example, the system images 210-1 to 210-*n* may generate the transaction layer packet 700 by including the access identification information ACCESS_ID in the prefix PREFIX. The system images 210-1 to 210-*n* may provide the PCIe function 600 with the generated transaction layer packet 700. The PCIe function 600 may receive the transaction layer packet 700 from the target system image (210-1 to 210-*n*). The prefix PREFIX of the received transaction layer packet 700 may include target identification information, i.e., the access identification information ACCESS_ID from the target system image (210-1 to 210-*n*).

The header HEADER may contain information required to determine the characteristics and purpose of the transaction layer packet 700. For example, the header HEADER may include information such as format, type, transaction ID, attributes, traffic class, address/routing information, byte enables, message encoding, and completion status of the transaction layer packet 700.

The data payload DATA PAYLOAD may include information to be transmitted through the transaction layer packet 700. In other words, the data payload DATA PAYLOAD may include information to be processed by the configuration receiving the transaction layer packet 700.

The digest DIGEST may include an end-to-end CRC (ECRC) value used to detect errors in the transaction layer packet 700. The digest DIGEST may be optional.

Figure 8:
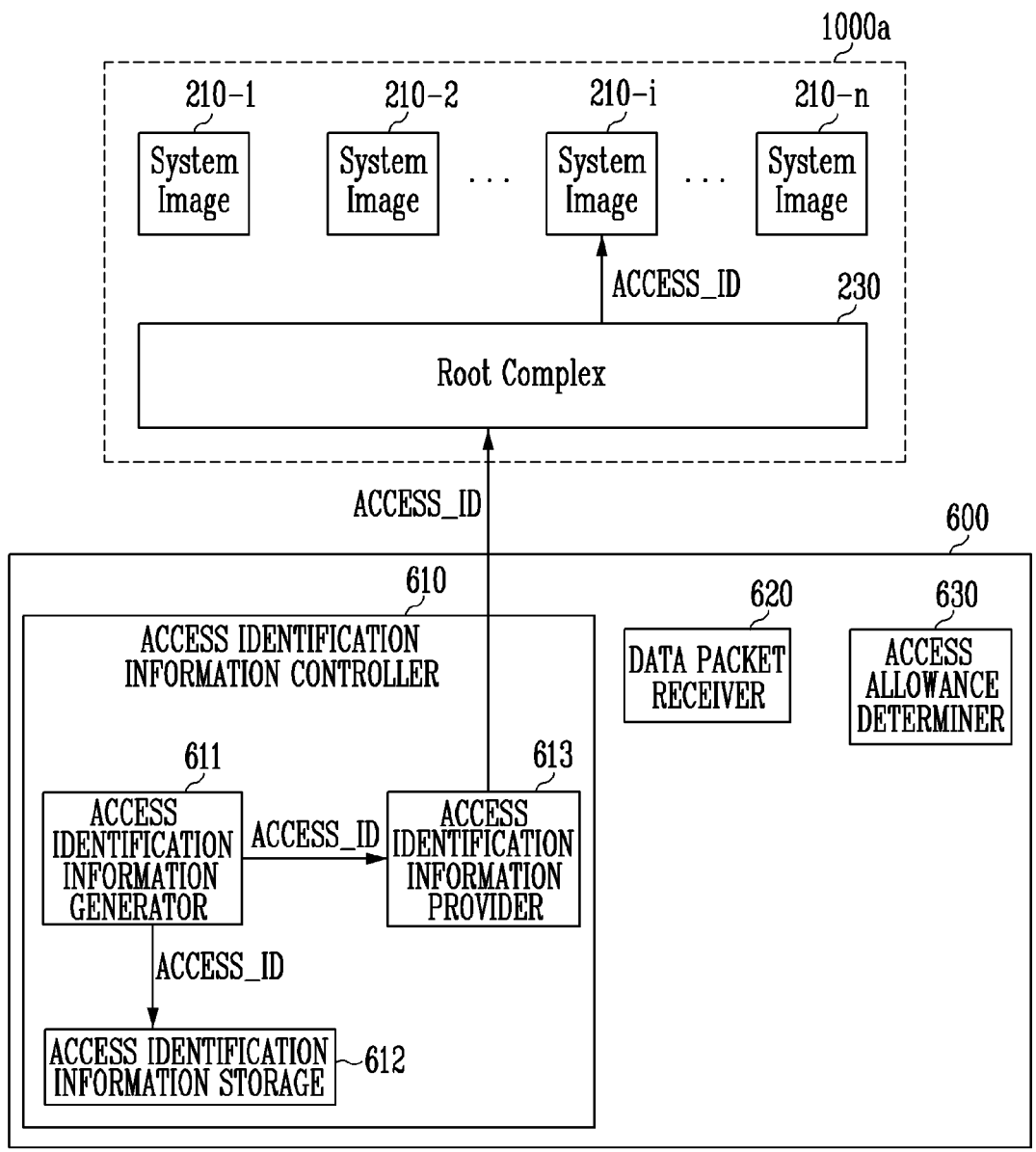
FIG. 8 illustrates an example of generation of access identification information according to an embodiment of the present disclosure.

FIG. 8 illustrates an example of generation of access identification information according to an embodiment of the present disclosure.

In FIG. 8, it may be assumed that the PCIe function 600 is assigned to the system image 210-*i*.

FIG. 8 illustrates an example in which the access identification information ACCESS_ID is generated by the PCIe function 600.

Referring to FIG. 8, the access identification information controller 610 may include an access identification information generator 611, an access identification information storage 612, and an access identification information provider 613.

The access identification information generator 611 may generate a random number according to a random number generation scheme and generate the access identification information ACCESS_ID based on the generated random number. For example, the access identification information ACCESS_ID may include a random number.

According to an embodiment, the access identification information generator 611 may generate a random number based on a different seed from a seed used in another PCIe function. The seed may include a random number table by which random numbers are generated. For example, a plurality of PCIe functions PCIe function 0 to PCIe function N may generate random numbers based on different respective seeds.

According to an embodiment, the access identification information generator 611 may determine whether or not to re-generate the access identification information ACCESS_ID based on a result of comparison between access identification information of another PCIe function and the access identification information generated by the access identification information generator 611. For example, the access identification information generator 611 may receive the access identification information of another PCIe function from the other PCIe function. Thereafter, the access identification information generator 611 may compare the access identification information of the other PCIe function with the access identification information generated by the access identification information generator 611. When the access identification information of the other PCIe function is consistent with the access identification information generated by the access identification information generator 611, the access identification information generator 611 may re-generate the access identification information of the PCIe function 600. In an embodiment, an access identification information is consistent with another access identification information when it is the same as the other access identification information, but embodiments are not limited thereto. Subsequently, the access identification information generator 611 may repeat access identification information comparison and access identification information re-generation until the access identification information of the other PCIe function becomes inconsistent with the access identification information generated by the access identification information generator 611. When the access identification information of another PCIe function is not consistent with the generated access identification information, the access identification information generator 611 may provide the generated access identification information ACCESS_ID to the access identification information storage 612 and the access identification information provider 613.

The access identification information storage 612 may store the access identification information ACCESS_ID. In embodiments, the access identification information storage 612 may store two or more different access identification information ACCESS_IDs.

The access identification information provider 613 may provide the assigned system image 210-$i$ with the access identification information ACCESS_ID. For example, the access identification information provider 613 may provide the root complex 230 with the access identification information ACCESS_ID. The root complex 230 may provide the assigned system image 210-$i$ with the access identification information ACCESS_ID.

In addition, when determining whether or not to allow an access, the access identification information provider 613 may provide the access allowance determiner 630 with the one or more access identification information ACCESS_ID stored in the access identification information storage 612.

According to an embodiment, the access identification information provider 613 may provide the access identification information ACCESS_ID using one of a vendor-defined message, a vendor-defined capability, a new PCIe capability defined by a user, Management Component Transport Protocol (MCTP) over SMbus (System Manager bus), and MCTP over PCIe.

According to an embodiment, the vendor-defined message may allow expansion of PCI Express messaging capabilities. For example, the vendor-defined message may include a requester ID field for transmitting a message, a receiver ID field for receiving a message, and a vendor-defined field. The receiver ID may include at least one of a bus number, a device number, and a function number. For example, the access identification information provider 613 may provide the access identification information ACCESS_ID to the system image 210-$i$ through the vendor-defined field of the vendor-defined message. The requester ID may include identification information of the PCIe function 600. The requester ID may include identification information of the system image 210-$i$.

According to an embodiment, the vendor-specific capability may be a capability structure in PCI-compatible Configuration Space. The vendor-specific capability may allow device vendors to use the capability mechanism for vendor-specific information. A vendor-specific capability register may include a capability ID field, a next capability pointer field, a capability length field, and a vendor specific information field. The capability ID field may indicate a PCIe capability structure. The capability ID field may provide a capability ID indicating a vendor-specific capability structure. The next capability pointer field may indicate an offset for the next PCI capability structure. When there are no other items in the linked list of capabilities, the next capability pointer field may include ooh. The capability length field may provide the number of bytes included in the capability structure. The vendor specific information field may vary depending on vendors. Therefore, the vendor specific information field may be set to various values depending on a user. For example, the access identification information provider 613 may provide the access identification information ACCESS_ID to the system image 210-$i$ through the vendor specific information field of the vendor specific capability.

According to an embodiment, the new PCIe capability defined by the user may include identification information of a device which provides information, identification information of device which receives information, and a field which includes information.

According to an embodiment, the access identification information controller 610 may update the access identification information ACCESS_ID every predetermined period. For example, the access identification information generator 611 may generate new access identification information every preset period. The access identification information generator 611 may perform the above-described access identification information comparison and access identification information re-generation. The access identification information storage 612 may store new access identification information, and the access identification information provider 613 may provide the assigned system image 210-$i$ with the new access identification information. Therefore, the system image 210-$i$ may store new access identification information every predetermined period. The system image 210-$i$ may remove the previous access identification information generated before the new access identification information is generated, and may provide the PCIe function 600 with a data packet including the new access identification information.

According to an embodiment, when the access identification information storage 612 receives the data packet including the new access identification information from the system image 210-*i* through the data packet receiver 620, the access identification information storage 612 may remove the old access identification information. The access allowance determiner 630 may allow an access of the data packet including the new access identification information. In other words, the access allowance determiner 630 may not permit an access to the data packet including the previous access identification information after the old identification information is removed. On the other hand, when the access identification information storage 612 does not receive the data packet including the new access identification information, and stores both the new access identification information and the old access identification information in the access identification information storage 612, the access allowance determiner 630 may allow an access to both new and old access identification information. The above access allowance operation will be described below with reference to FIG. 11.

Figure 9:
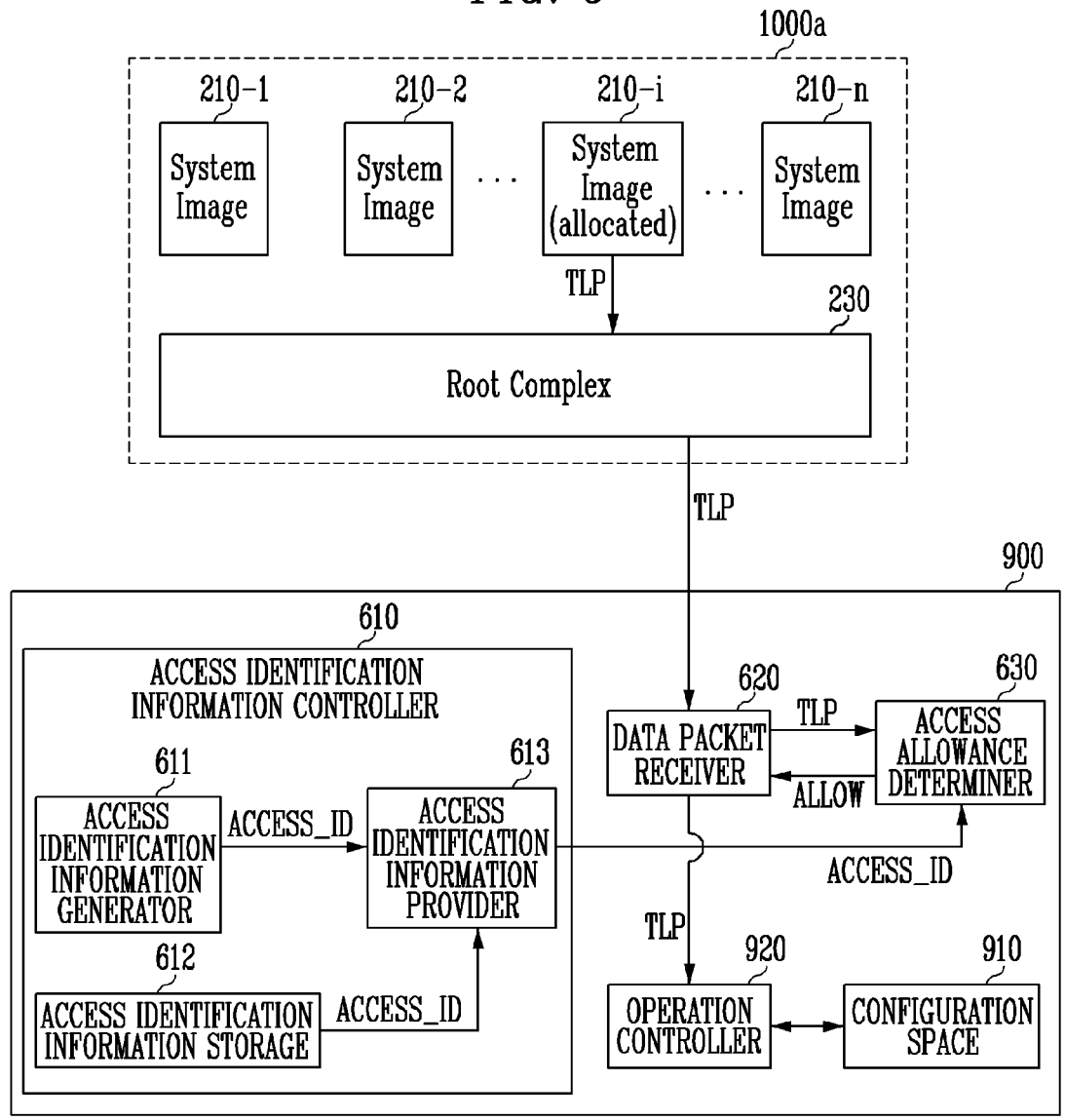
FIG. 9 illustrates an example in which an access is allowed according to an embodiment of the present disclosure.

FIG. 9 illustrates an example in which an access is allowed according to an embodiment of the present disclosure.

In FIG. 9, it may be assumed that a PCIe function 900 is assigned to the system image 210-*i*.

Referring to FIG. 9, the PCIe function 900 may further include a configuration space 910 and an operation controller 920. In the example shown in FIG. 9, descriptions of the access identification information controller 610, the access identification information generator 611, the access identification information storage 612, and the access allowance determiner 630 will be omitted since they are the same configurations as shown in FIG. 8.

The configuration space 910 may include information for configuring the PCIe function 900. For example, the configuration space 910 may include registers for configuring the PCIe function 900 to perform operations associated with a PCIe interface. According to an embodiment, the configuration space 910 may include information on capabilities available in the PCIe function 900.

According to an embodiment, the PCIe function 900 may perform a configuration operation in response to a configuration request of the host 1000*a*. The PCIe function 900 and the host 1000*a* may perform communication based on values stored in the configuration space 910 which are set according to the configuration operation.

The operation controller 920 may control operations of the PCIe function 900 based on information included in the configuration space 910. For example, the operation controller 920 may control the operations of the PCIe function 900 based on the configuration space 910 that is set according to the configuration operation. For example, the operation controller 920 may control operations of the PCIe function 900 based on the field values of the registers set in the configuration space 910.

According to an embodiment, the operation controller 920 may process the transaction layer packet TLP provided from the data packet receiver 620 when access allowance is determined. For example, the target system image 210-*i* may provide the data packet receiver 620 with the transaction layer packet TLP including the target identification information stored in the target system image 210-*i*. The target identification information stored in the system image 210-*i* may indicate access identification information. The access allowance determiner 630 may receive the transaction layer packet TLP from the data packet receiver 620 and receive the access identification information ACCESS_ID stored in the access identification information storage 612 from the access identification information provider 613. Since the target identification information stored in the transaction layer packet TLP and the access identification information ACCESS_ID stored in the access identification information storage 612 are consistent with (for example, the same as) each other, the access allowance determiner 630 may allow an access of the transaction layer packet TLP. The access allowance determiner 630 may provide an access allow signal ALLOW to the data packet receiver 620. The operation controller 920 may process the transaction layer packet TLP provided from the data packet receiver 620 according to the access allow signal ALLOW.

Figure 10:
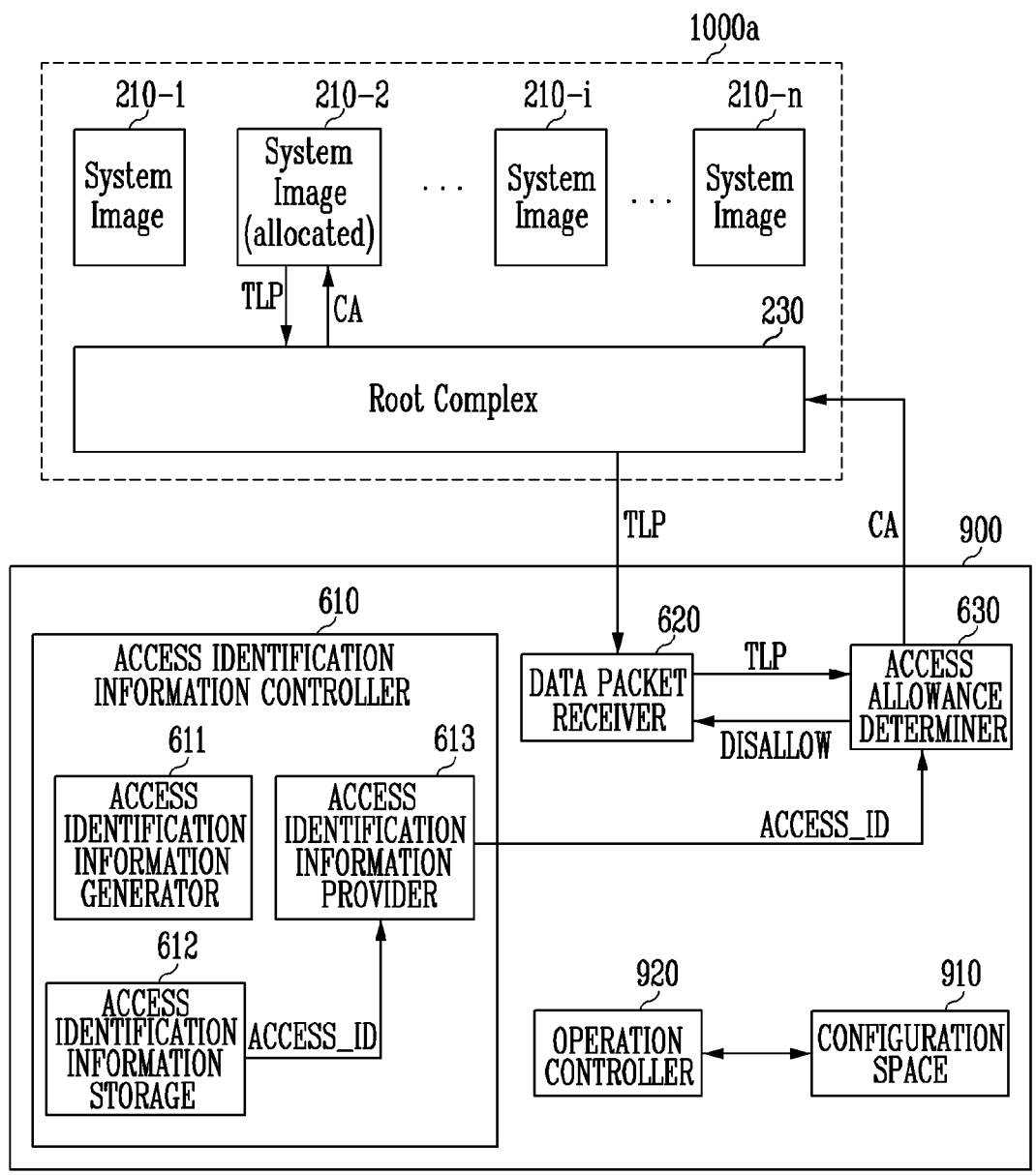
FIG. 10 illustrates an example in which an access is not allowed according to an embodiment of the present disclosure.

FIG. 10 illustrates an example in which an access is not allowed according to an embodiment of the present disclosure.

In FIG. 10, it may be assumed that the PCIe function 900 is assigned to the system image 210-*i*. In addition, it may be assumed that the PCIe function 900 receives the transaction layer packet TLP from a non-assigned system image 210-2.

Referring to FIG. 10, the target system image 210-2 may provide the data packet receiver 620 with the transaction layer packet TLP including target identification information stored in the target system image 210-2. The target identification information stored in the target system image 210-2 may indicate access identification information. The access allowance determiner 630 may receive the transaction layer packet TLP from the data packet receiver 620 and may receive the access identification information ACCESS_ID stored in the access identification information storage 612 from the access identification information provider 613. Since the target identification information stored in the transaction layer packet TLP and the access identification information ACCESS_ID are not consistent with each other, the access allowance determiner 630 may not allow an access of the transaction layer packet TLP. In an embodiment, the access identification information is consistent with the target identification information when it is the same as the target identification information, but embodiments are not limited thereto. The access allowance determiner 630 may provide an access disallow signal DISALLOW to the data packet receiver 620. The data packet receiver 620 may discard the transaction layer packet TLP in response to the access disallow signal DISALLOW.

According to an embodiment, the access allowance determiner 630 may provide the target system image 210-2 with Completer Abort (CA) information. For example, the access allowance determiner 630 may provide completion information in response to the transaction layer packet TLP. The completion information may include information indicating the current status of the PCIe function 900. For example, the completion information may include a completion header including a completion status field. The completion status field may include Successful Completion (SC) information, Unsupported Request (UR) information, Configuration Request Retry Status (CRS) information, and Completer Abort (CA) information. For example, the access allowance determiner 630 may return the CA information to the target system image 210-2 according to an access-disallowed determination with respect to the transaction layer packet TLP.

Figure 11:
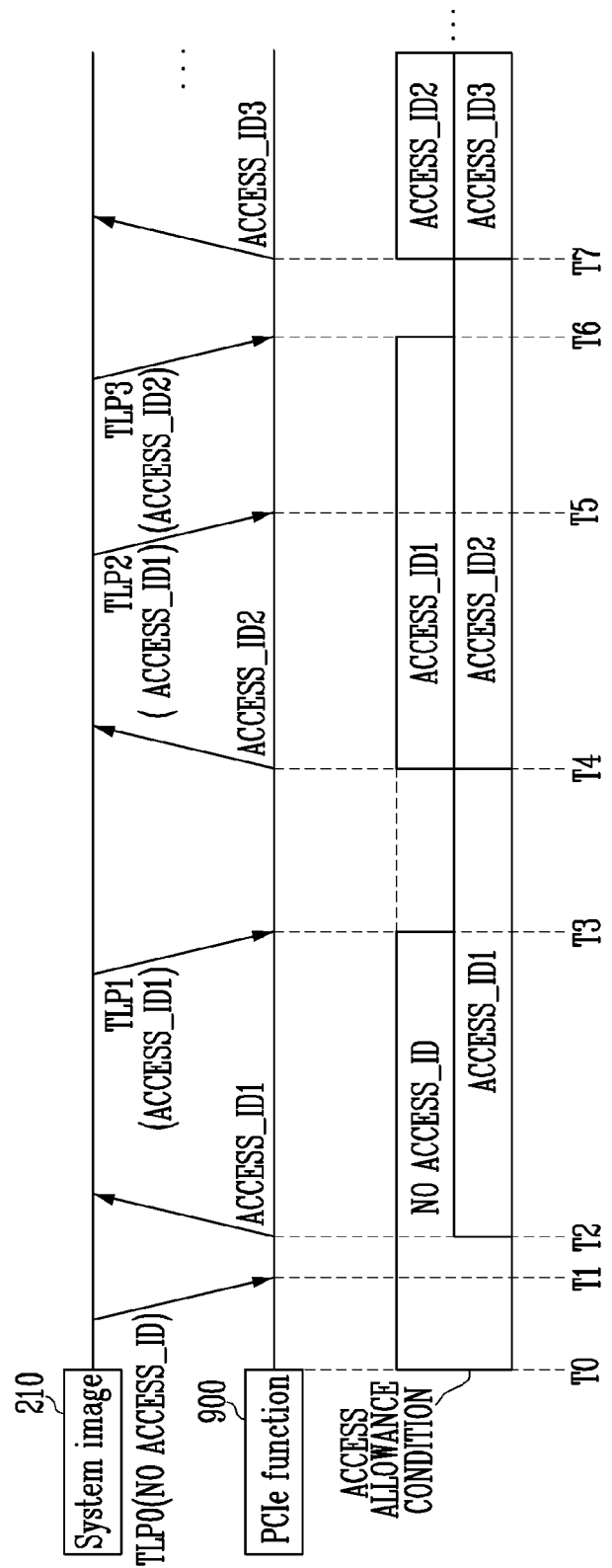
FIG. 11 illustrates an example in which whether or not to allow an access is determined according to an embodiment of the present disclosure.

FIG. 11 illustrates an example in which whether or not to allow an access is determined according to an embodiment of the present disclosure.

In FIG. 11, arrows directed at the top and center indicate operations by which the system image 210 transfers a transaction layer packet and the PCIe function 900 provides access identification information according to the flow of time. Blocks at the bottom indicate access allowance conditions with time. The access allowance conditions may refer to access identification information used for comparison with target identification information. It may be assumed that the PCIe function 900 is assigned to the system image 210. The system image 210 may indicate one of the plurality of system images 210-1 to 210-n as shown in FIG. 2. The operations described with reference to FIG. 11 may apply to the PCIe function 600.

Referring to FIG. 11, at T0, the computing system 200 may be in a state where the computing system 200 performs normal packet exchange by link initialization and training. Access identification information may not be present in the access identification information storage 612 (NO ACCESS_ID) since the PCIe function 900 has not yet received a transaction layer packet from the system image 210.

In addition, the transaction layer packet TLP which is provided first to the PCIe function 900 may not include the access identification information because the system image 210 has not yet received the access identification information from the PCIe function 900.

At T1, the PCIe function 900 may receive a transaction layer packet TLP0 which does not include access identification information. Since the access identification information storage 612 does not contain the access identification information, the access allowance determiner 630 may allow an access of the transaction layer packet TLP0.

At T2, the access identification information generator 611 may generate first access identification information ACCESS_ID1. The generated first access identification information ACCESS_ID1 may be stored in the access identification information storage 612. In addition, the PCIe function 900 may provide the first access identification information ACCESS_ID1 to the system image 210.

According to an embodiment, when either of the new access identification information or the (not-yet-deleted) old access identification information generated before the new access identification information is consistent with the target identification information, the access allowance determiner 630 may allow an access of the target system image 210. When both the new access identification information and the old access identification information are not consistent with the target identification information, the access allowance determiner 630 may not allow the access and may provide the target system image 210 with the CA information. In other words, the access allowance determiner 630 may use the new access identification information and the old access identification information as the access allowance conditions until the old access identification information is updated to the new access identification information and deleted. The old access identification information may be deleted from the access identification information storage 612 at a time when a transaction layer packet including new access identification information is received.

For example, from T2 to T3 when a transaction layer packet TLP1 including target identification information consistent with the first access identification information ACCESS_ID1 is received, the access allowance determiner 630 may allow an access of a transaction layer packet not including access identification information or a transaction layer packet including the first access identification information ACCESS_ID1.

At T3, the PCIe function 900 may receive the transaction layer packet TLP1 including the first access identification information ACCESS_ID1 from the system image 210. Because the first access identification information ACCESS_ID1 has not been deleted yet, the access allowance determiner 630 may allow an access of the transaction layer packet TLP1. In addition, the access allowance determiner 630 may remove the transaction layer packet not including the access identification information from the access allowance conditions; that is, after the transaction layer packet TLP1 including the target identification information consistent with the first access identification information ACCESS_ID1 is received by the PCIe function 900 at T3, access by transaction layer packets that do not include access identification information will not be allowed.

From T3 to T4 when second access identification information ACCESS_ID2 is generated, the access allowance determiner 630 may allow an access of the transaction layer packet including target identification information consistent with the first access identification information ACCESS_ID1.

At T4, the access identification information generator 611 may generate the second access identification information ACCESS_ID2. T4 may refer to a time after a predetermined period of time has passed from T2. The second access identification information ACCESS_ID2 may be stored in the access identification information storage 612. The access identification information storage 612 may store the first access identification information ACCESS_ID1 and the second access identification information ACCESS_ID2 together. In addition, the PCIe function 900 may provide the second access identification information ACCESS_ID2 to the system image 210.

From T4 to T6 when a transaction layer packet TLP3 including the second access identification information ACCESS_ID2 is received, the access allowance determiner 630 may allow an access of the transaction layer packet including target identification information consistent with the first access identification information ACCESS_ID1 or the transaction layer packet including target identification information consistent with the second access identification information ACCESS_ID2.

At T5, the PCIe function 900 may receive the transaction layer packet TLP2 including target identification information consistent with the first access identification information ACCESS_ID1 from the system image 210. The access allowance determiner 630 may allow an access of the transaction layer packet TLP2. The first access identification information ACCESS_ID1 may remain in the access identification information storage 612 since the PCIe function 900 has received the target identification information consistent with first access identification information ACCESS_ID1 corresponding to the old access identification information, not target identification information consistent with the new access identification information, i.e., the second access identification information ACCESS_ID2.

At T6, the PCIe function 900 may receive the transaction layer packet TLP3 including target identification information consistent with the second access identification information ACCESS_ID2 from the system image 210. In response, the access allowance determiner 630 may allow an access of the transaction layer packet TLP3, and the access identification information storage 612 may remove the first access identification information ACCESS_ID1. In addition, the access allowance determiner 630 may remove the transaction layer packet including target identification information consistent with the first access identification information ACCESS_ID1 from the access allowance conditions.

According to an embodiment, when the old access identification information is removed from the access identification information storage 612, the access allowance determiner 630 may determine whether or not to allow an access of the target system image 210 based on a result of comparing the most recent access identification information with the target identification information. For example, when the most recent access identification information and the target identification information are consistent with each other, the access allowance determiner 630 may allow the access of the target system image 210. In addition, when the new access identification information is not consistent with the target identification information, the access allowance determiner 630 may not allow the access and may provide the target system image 210 with the CA information.

For example, from T6 to T7 when third access identification information ACCESS_ID3 is generated, the access allowance determiner 630 may allow an access of the transaction layer packet including target identification information consistent with the second access identification information ACCESS_ID2.

At T7, the access identification information generator 611 may generate the third access identification information ACCESS_ID3. T7 may refer to a time after a predetermined period of time has passed from T4. The third access identification information ACCESS_ID3 may be stored in the access identification information storage 612. The access identification information storage 612 may store the second access identification information ACCESS_ID2 and the third access identification information ACCESS_ID3 together. In addition, the PCIe function 900 may provide the third access identification information ACCESS_ID3 to the system image 210.

From T7 to the time when a transaction layer packet including the third access identification information ACCESS_ID3 is received, the access allowance determiner 630 may allow the access of the transaction layer packet including target identification information consistent with the second access identification information ACCESS_ID2 or the transaction layer packet including target identification information consistent with the third access identification information ACCESS_ID3.

Figure 12:
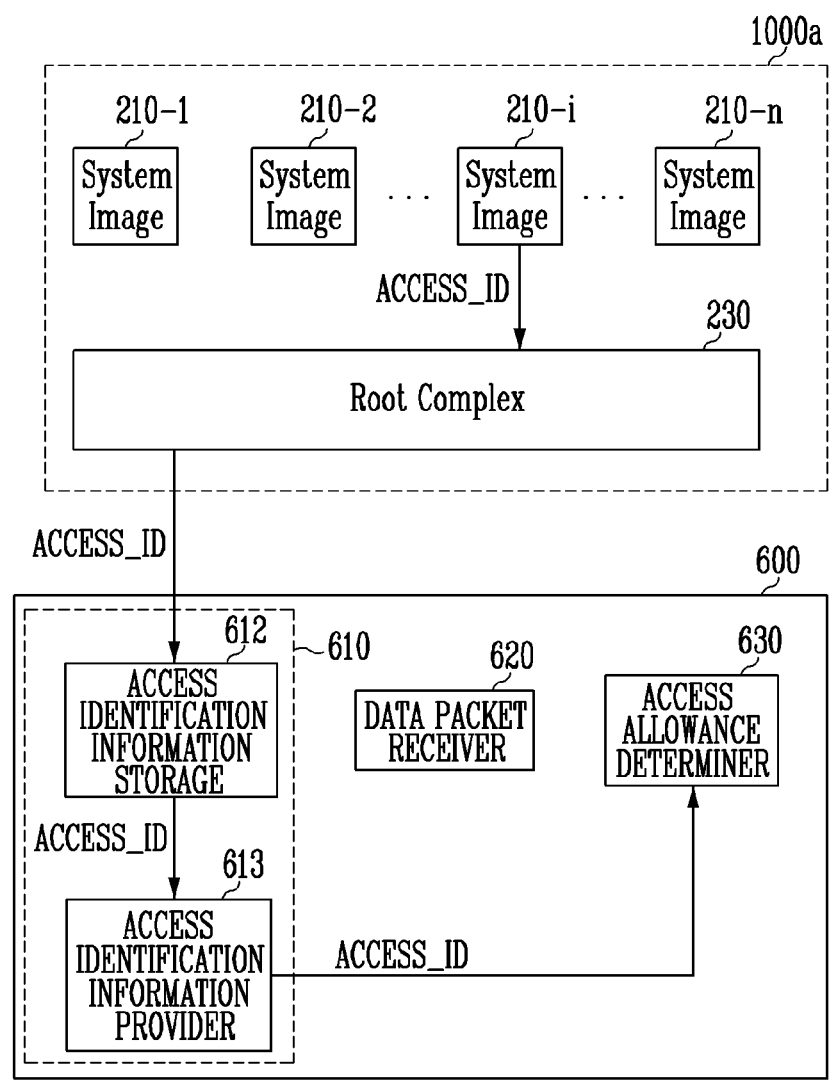
FIG. 12 illustrates another example of generation of access identification information according to an embodiment of the present disclosure.

FIG. 12 illustrates another example of generation of access identification information according to an embodiment of the present disclosure.

An example in which the access identification information ACCESS_ID is generated by the system images 210-1 to 210-n is described with reference to FIG. 12. In FIG. 12, it may be assumed that the PCIe function 600 is assigned to the system image 210-i. In addition, in FIG. 12, the access identification information controller 610 may not include the access identification information generator 611.

Descriptions of the host 1000a, the plurality of system images 210-1 to 210-n, the root complex 230, the data packet receiver 620 and the access allowance determiner 630 as shown in FIG. 12 will be omitted since they are the same as those shown in FIG. 6 or 8.

Referring to FIG. 12, the host 1000a may generate the access identification information ACCESS_ID. For example, the system image 210-i may generate the access identification information ACCESS_ID. The system image 210-i may store the access identification information ACCESS_ID. The system image 210-i may provide the access identification information ACCESS_ID to the PCIe function 600. The access identification information generation operations performed by the access identification information generator 611, such as access identification information generation based on a random number, access identification information re-generation, and access identification information update at a predetermined period as described above with reference to FIG. 8 may in this embodiment be performed by the system image 210-i.

According to an embodiment, the system image 210-i may provide the access identification information ACCESS_ID to the PCIe function 600 by using one of a vendor-defined message, a vendor-defined capability, a new PCIe capability defined by a user, Management Component Transport Protocol (MCTP) over SMbus (System Manager bus), and MCTP over PCIe.

The access identification information storage 612 may store the access identification information ACCESS_ID provided from the system image 210-i. The access allowance determiner 630 may determine whether or not to allow an access based on the access identification information ACCESS_ID transferred from the access identification information provider 613.

Since the access identification information ACCESS_ID is generated by the system image 210-i, the system image 210-i may not need to provide the old access identification information; that is, the system image 210-i will send no packets using older access identification information after sending the newly-generated access identification information ACCESS_ID. Therefore, when the access identification information ACCESS_ID is updated every predetermined period by the system image 210-i, the access allowance determiner 630 may determine whether or not to allow an access based on only the most-recently-received access identification information.

Figure 13:
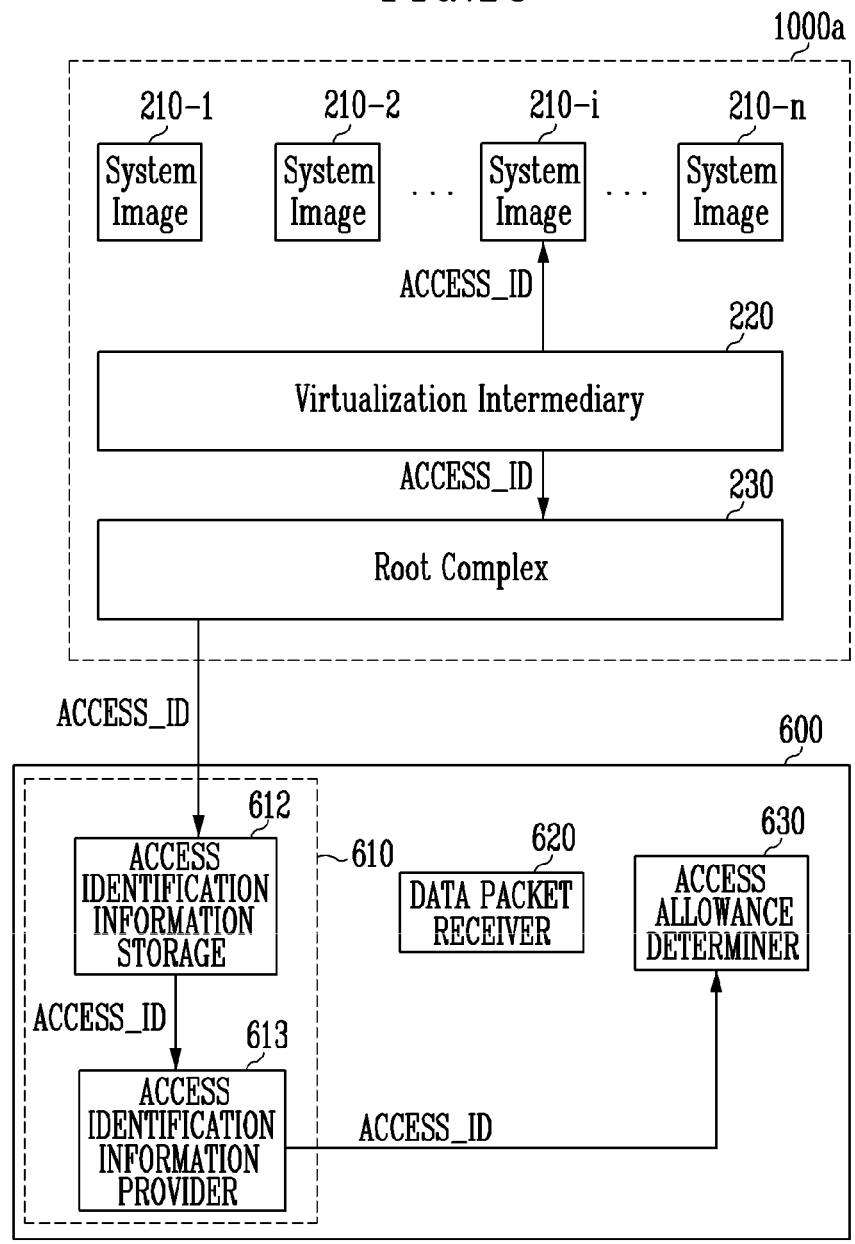
FIG. 13 illustrates another example of generation of access identification information according to an embodiment of the present disclosure.

FIG. 13 illustrates another example of generation of access identification information according to an embodiment of the present disclosure.

FIG. 13 illustrates an example in which the access identification information ACCESS_ID is generated by the virtualization intermediary 220. In FIG. 13, it may be assumed that the PCIe function 600 is assigned to the system image 210-i. In addition, in FIG. 13, the access identification information controller 610 may not include the access identification information generator 611.

Descriptions of the host 1000a, the plurality of system images 210-1 to 210-n, the root complex 230, the data packet receiver 620, and the access allowance determiner 630 as shown in FIG. 13 will be omitted since they are the same as those shown in FIG. 6 or 8.

Referring to FIG. 13, the host 1000a may generate the access identification information ACCESS_ID. For example, the virtualization intermediary 220 may generate the access identification information ACCESS_ID. For example, the virtualization intermediary 220 may store the access identification information ACCESS_ID. The virtualization intermediary 220 may provide the access identification information ACCESS_ID to the system image 210-i and the PCIe function 600. The access identification information generation operations performed by the access identification information generator 611, such as access identification information generation based on a random number, access identification information re-generation, and access identification information update at a predetermined period as described above with reference to FIG. 8 may in this embodiment be performed by the virtualization intermediary 220.

According to an embodiment, the virtualization intermediary 220 may provide the PCIe function 600 with the access identification information ACCESS_ID by using one of a vendor-defined message, a vendor-defined capability, a new PCIe capability defined by a user, Management Component Transport Protocol (MCTP) over SMbus (System Manager bus), and MCTP over PCIe.

The access identification information storage 612 may store the access identification information ACCESS_ID provided from the virtualization intermediary 220. The access allowance determiner 630 may determine whether or not to allow an access based on the access identification information ACCESS_ID transferred from the access identification information provider 613.

The system image 210-*i* may require time to update the old access identification information to the new access identification information after the access identification information ACCESS_ID is generated by the virtualization intermediary 220. Therefore, the operation of determining whether or not to allow an access as described above with reference to FIG. 11 may apply to the access allowance determiner 630.

Figure 14:
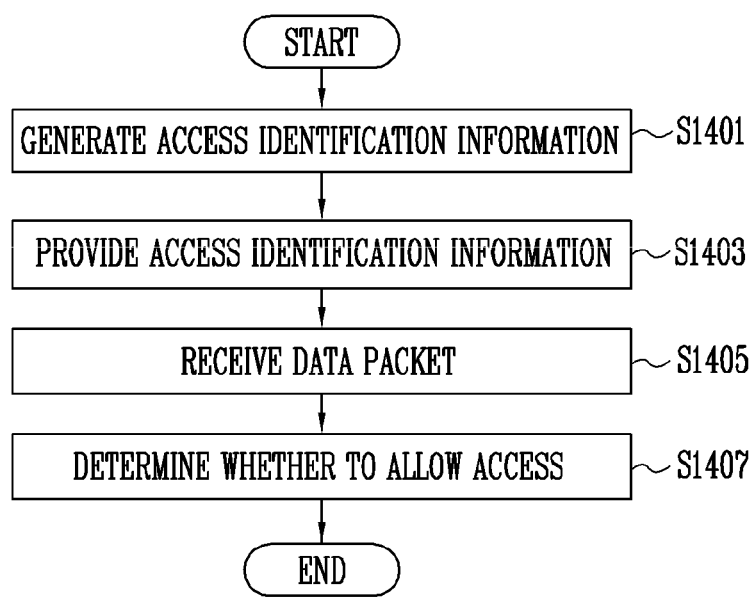
FIG. 14 is a flowchart illustrating a process of operating a PCIe function according to an embodiment of the present invention.

FIG. 14 is a flowchart illustrating a process of operating a PCIe function according to an embodiment of the present invention.

Referring to FIG. 14, the operating process may be performed by the PCIe function 600 of FIG. 6 or 8 or the PCIe function 900 of FIG. 9 or 10. Therefore, the process of operating the PCIe function 600 to be described below may be applicable to the PCIe function 900.

Referring to FIG. 14, at step S1401, the PCIe function 600 may generate access identification information.

At step S1403, the PCIe function 600 may provide an assigned system image with access identification information.

According to an embodiment, the PCIe function 600 may provide the access identification information by using one of a vendor-defined message, a vendor-defined capability, a new PCIe capability defined by a user, Management Component Transport Protocol (MCTP) over SMbus (System Manager bus), and MCTP over PCIe.

At step S1405, the PCIe function 600 may receive a data packet including target identification information indicating a target system image from a target system image from among a plurality of system images.

The target identification information may be included in a prefix of the data packet.

At step S1407, the PCIe function 600 may determine whether or not to allow an access of the target system image based on the access identification information and the target identification information.

When the access identification information and the target identification information are consistent with each other, the PCIe function 600 may allow the access of the target system image. In addition, when the access identification information and the target identification information are not consistent with each other, the PCIe function 600 may not allow the access and may provide CA information to the target system image.

Figure 15:
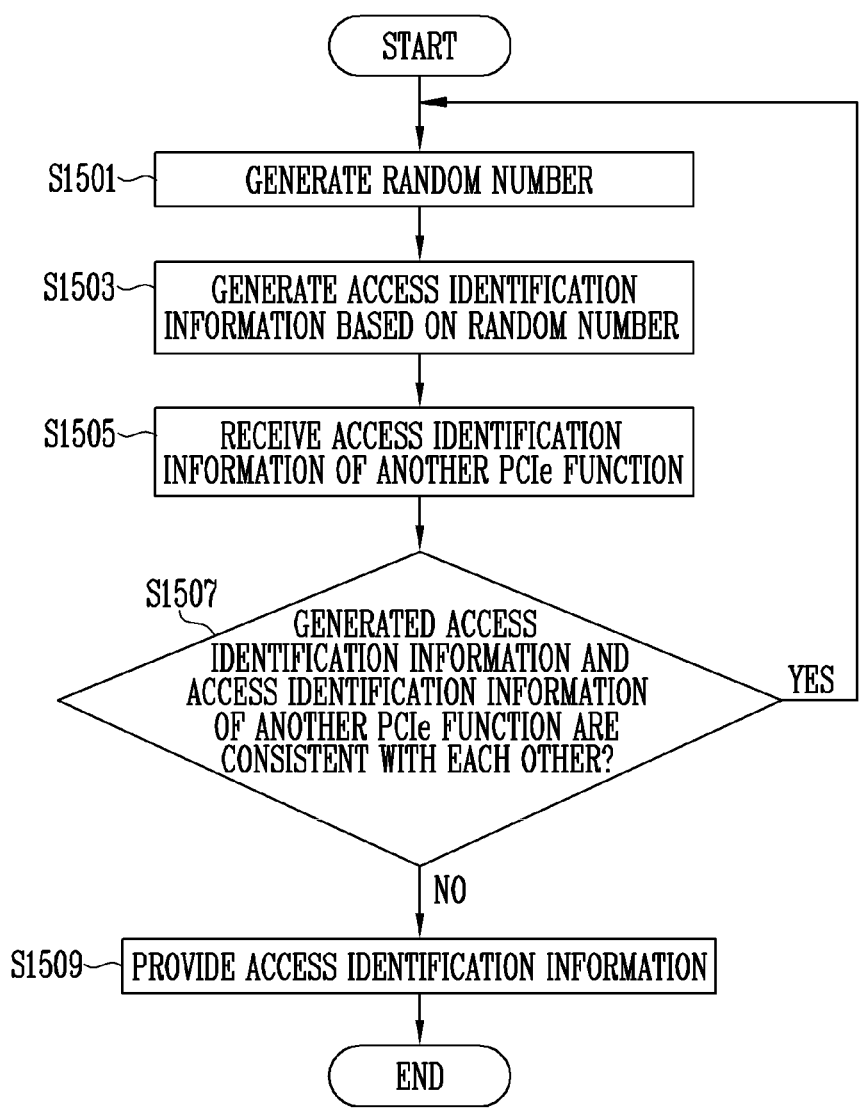
FIG. 15 is a flowchart illustrating a process of generating access identification information according to an embodiment of the present disclosure.

FIG. 15 is a flowchart illustrating a process of generating access identification information according to an embodiment of the present disclosure.

According to an embodiment, FIG. 15 is a detailed diagram of steps S1401 and S1403 of FIG. 14.

Referring to FIG. 15, the process of generating access identification information may be performed by the PCIe function 600 of FIG. 6 or 8 or the PCIe function 900 of FIG. 9 or 10. Therefore, the operating process by the PCIe function 600 to be described below may be applicable to the PCIe function 900.

Referring to FIG. 15, at step S1501, the PCIe function 600 may generate a random number using a random number generation scheme.

The PCIe function 600 may generate the random number based on a different seed from a seed used by another PCIe function.

At step S1503, the PCIe function 600 may generate access identification information based on the generated random number.

At step S1505, the PCIe function 600 may receive access identification information of another PCIe function from another PCIe function.

At step S1507, the PCIe function 600 may determine whether the access identification information of the other PCIe function is consistent with the generated access identification information.

According to a result of determination at step S1507, when the access identification information of the other PCIe function is consistent with the generated access identification information, the PCIe function 600 may repeat steps S1501, S1503, and S1505.

According to the result of determination at step S1507, when the access identification information of the other PCIe function is not consistent with the generated access identification information, the PCIe function 600 may provide the generated access identification information to the system image at step S1509.

Figure 16:
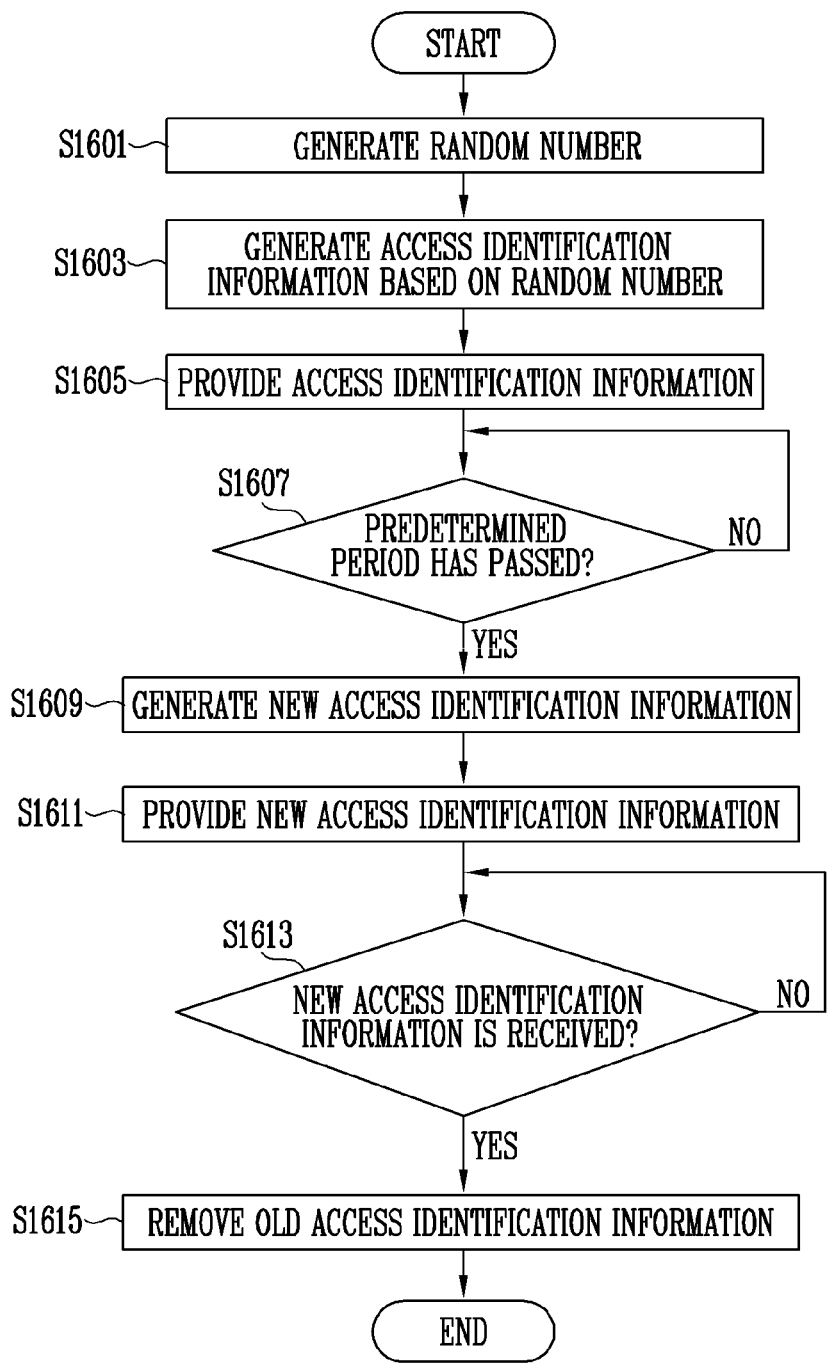
FIG. 16 is a flowchart illustrating a process of managing access identification information according to an embodiment of the present disclosure.

FIG. 16 is a flowchart illustrating a process of managing access identification information according to an embodiment of the present disclosure.

According to an embodiment, FIG. 16 is a detailed diagram of steps S1401 and S1403 of FIG. 14.

Referring to FIG. 16, the process of managing access identification information may be performed by the PCIe function 600 of FIG. 6 or 8 or the PCIe function 900 of FIG. 9 or 10. Therefore, the operating process performed by the PCIe function 600 to be described below may be applicable to the PCIe function 900.

Referring to FIG. 16, at step S1601, the PCIe function 600 may generate a random number by a random number generation scheme.

At step S1603, the PCIe function 600 may generate access identification information based on the generated random number.

At step S1605, the PCIe function 600 may provide the generated access identification information to a system image.

At step S1607, the PCIe function 600 may determine whether a predetermined period has passed from a time when the access identification information was last generated.

According to a result of determination at step S1607, when the predetermined period has not passed, the PCIe function 600 may continue to check whether the predetermined period has passed at step S1607.

According to the result of determination at step S1607, when the predetermined period has passed, the PCIe function 600 may generate new access identification information at step S1609.

At step S1611, the PCIe function 600 may provide the new access identification information to the system image.

At step S1613, the PCIe function 600 may determine whether the new access identification information is received. For example, the PCIe function 600 may determine whether a data packet including target identification information consistent with the new access identification information is received.

As a result of determination at step S1613, when the new access identification information is not received, at step S1613 the PCIe function 600 may continue to check whether the new access identification information is received.

As the result of determination at step S1613, when the new access identification information is received, at step S1615 the PCIe function 600 may remove the old access identification information that was generated before the new access identification information was generated.

Figure 17:
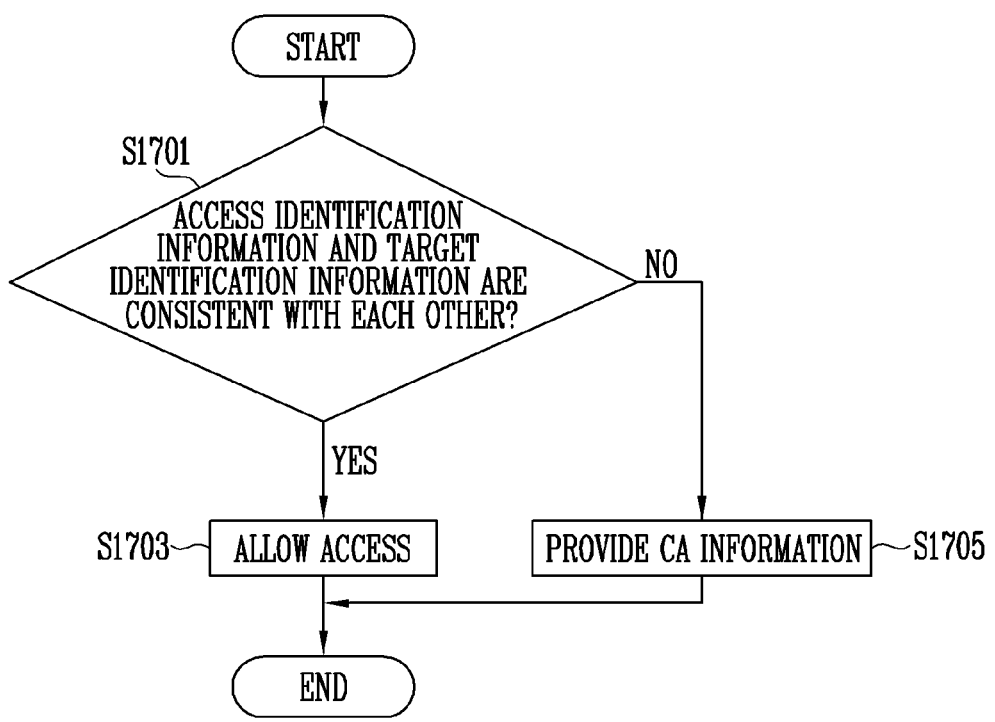
FIG. 17 is a flowchart illustrating a process of determining whether or not to allow an access according to an embodiment of the present disclosure.

FIG. 17 is a flowchart illustrating a process of determining whether or not to allow an access according to an embodiment of the present disclosure.

According to an embodiment, FIG. 17 is a detailed diagram of step S1407 of FIG. 14.

For example, referring to FIG. 17, the process of determining whether or not to allow an access may be performed by the PCIe function 600 of FIG. 6 or 8 or the PCIe function 900 of FIG. 9 or 10. Therefore, the process of operating the PCIe function 600 to be described below may be applicable to the PCIe function 900.

Referring to FIG. 17, at step S1701, the PCIe function 600 may determine whether the access identification information and target identification information received from a system image are consistent with each other.

As a result of determination at step S1701, when the access identification information and the target identification information are consistent with each other, the PCIe function 600 may allow an access of the system image at step S1703.

As the result of determination at step S1701, when the access identification information and the target identification information are not consistent with each other, the PCIe function 600 may provide the system image with CA information at step S1705.

According to the present disclosure, a high security PCIe function and an operating process thereof may be provided.

According to the present disclosure, a PCIe function showing no performance degradation due to address translation and an operating process thereof may be provided.

While the exemplary embodiments of the present disclosure have been disclosed for illustrative purposes, those skilled in the art will appreciate that various modifications, additions and substitutions are possible. Thus, it is intended that the present invention cover all such modifications provided they come within the scope of the appended claims and their equivalents.

What is claimed is:

1. A Peripheral Component Interconnect Express (PCIe) function, the PCIe function comprising:
an access identification information controller generating first access identification information for allowing an access to the PCIe function, and providing the first access identification information to an assigned system image to which the PCIe function has been assigned, the assigned system image being one of a plurality of system images;
a data packet receiver receiving a data packet including target identification information indicating a target system image selected from the plurality of system images from the target system image; and
an access allowance determiner determining whether or not to allow an access of the target system image based on the first access identification information and the target identification information.

2. The PCIe function of claim 1, wherein the PCIe function is one of a physical function, a virtual function and a base function.

3. The PCIe function of claim 1, wherein the target identification information is included in a prefix of the data packet.

4. The PCIe function of claim 1, wherein the access allowance determiner allows the access of the target system image when the first access identification information and the target identification information are consistent with each other, or
the access allowance determiner provides completer abort (CA) information to the target system image when the first access identification information and the target identification information are not consistent with each other.

5. The PCIe function of claim 1, wherein the PCIe function is a first PCIe function and the access identification information controller comprises:
an access identification information generator generating a random number according to a random number generation scheme, where the random number is used to generate the first access identification information;
an access identification information storage storing the first access identification information; and
an access identification information provider providing the first access identification information to the assigned system image.

6. The PCIe function of claim 5, wherein the access identification information generator generates the random number based on a different seed from a seed used in a second PCIe function different from the first PCIe function.

7. The PCIe function of claim 5, wherein the access identification information generator receives access identification information of a second PCIe function from the second PCIe function, and re-generates the first access identification information of the PCIe function when the access identification information of the second PCIe function and the first access identification information generated by the access identification information generator are consistent with each other.

8. The PCIe function of claim 5, wherein the access identification information generator generates second access identification information at a predetermined time after generating the first access identification information,
wherein the access identification information storage stores the second access identification information, and
wherein the access identification information provider provides the second access identification information to the assigned system image.

9. The PCIe function of claim 8, wherein when the first access identification information and the second access identification information are stored in the access identification information storage:
the access allowance determiner allows the access of the target system image when the second access identification information or the first access identification information is consistent with the target identification information, and
the access allowance determiner provides completer abort (CA) information to the target system image when the second access identification information is not consistent with the target identification information and the first access identification information is not consistent with the target identification information.

10. The PCIe function of claim 8, wherein the access identification information storage removes the first access identification information when the data packet receiver receives a data packet including target identification information consistent with the second access identification information.

11. The PCIe function of claim 10, wherein the access allowance determiner allows the access of the target system image when the second access identification information and the target identification information are consistent with each other, and the access allowance determiner provides completer abort (CA) information to the target system image when the second access identification information and the target identification information are not consistent with each other.

12. The PCIe function of claim 5, wherein the access identification information provider provides the first access identification information to the assigned system image by using one of a vendor-defined message, a vendor-defined capability, a new PCIe capability defined by a user, Management Component Transport Protocol (MCTP) over SMbus (System Manager bus), and MCTP over PCIe.

13. A computing system, comprising:
a plurality of Peripheral Component Interconnect Express (PCIe) functions; and
a host including a plurality of system images, the host configured to perform:
generating access identification information for allowing an access to a PCIe function among the plurality of PCIe function that is assigned to a corresponding system image of the plurality of system images, and
providing the access identification information to the PCIe function; and
the PCIe function configured to perform:
storing the access identification information provided from the host,
receiving a data packet including target identification information indicating a target system image from the target system image, the target system image being one of the plurality of system images, and
determining whether or not to allow an access of the target system image based on the access identification information and the target identification information.

14. The computing system of claim 13, wherein the corresponding system image stores the access identification information, generates a data packet including the access identification information, and provides the data packet to the PCIe function to access the PCIe function.

15. The computing system of claim 14, wherein the access identification information is included in a prefix of the data packet.

16. The computing system of claim 13, wherein the host further comprises a virtualization intermediary managing the plurality of system images.

17. The computing system of claim 16, wherein the access identification information is generated by one of the corresponding system image and the virtualization intermediary.

18. The computing system of claim 13, wherein the host provides the access identification information to the assigned PCIe function by using one of a vendor-defined message, a vendor-defined capability, a new PCIe capability defined by a user, Management Component Transport Protocol (MCTP) over SMbus (System Manager bus), and MCTP over PCIe.

19. A Peripheral Component Interconnect Express (PCIe) function, the PCIe function comprising:

an access identification information controller configured to generate first access identification information for allowing an access to the PCIe function;
a data packet receiver configured to receive a data packet including target identification information indicating a target system image selected from the plurality of system images; and
an access allowance determiner configured to determine whether or not to allow an access of the target system image based on the first access identification information and the target identification information.

20. The PCIe function of claim 19, wherein the access identification information controller is configured to provide the first access identification information to an assigned system image to which the PCIe function has been assigned, the assigned system image being one of a plurality of system images.

21. The PCIe function of claim 19, wherein the PCIe function is one of a physical function, a virtual function and a base function.

22. The PCIe function of claim 19, wherein the target identification information is included in a prefix of the data packet.

23. The PCIe function of claim 19, wherein the access allowance determiner allows the access of the target system image when the first access identification information and the target identification information satisfy a condition.

24. The PCIe function of claim 23, wherein the condition includes that the first access identification information and the target identification information are consistent with each other.

25. The PCIe function of claim 19, wherein the access allowance determiner provides completer abort information to the target system image when the first access identification information and the target identification information does not satisfy a condition.

26. The PCIe function of claim 19, wherein the PCIe function is a first PCIe function.

27. The PCIe function of claim 26, wherein the access identification information controller comprises:
an access identification information generator configured to generate a random number according to a random number generation scheme, where the random number is used to generate the first access identification information;
an access identification information storage configured to store the first access identification information; and
an access identification information provider configured to provide the first access identification information to the assigned system image.

28. The PCIe function of claim 27, wherein the access identification information generator generates the random number based on a different seed from a seed used in a second PCIe function different from the first PCIe function.

29. The PCIe function of claim 27, wherein the access identification information generator receives access identification information of a second PCIe function from the second PCIe function, and re-generates the first access identification information of the PCIe function when the access identification information of the second PCIe function and the first access identification information generated by the access identification information generator satisfy a condition.

30. The PCIe function of claim 27, wherein the access identification information generator generates second access identification information at a predetermined time after generating the first access identification information, wherein the access identification information storage stores the second access identification information, and wherein the access identification information provider provides the second access identification information to the assigned system image.

31. The PCIe function of claim 27, wherein when the first access identification information and second access identification information are stored in the access identification information storage:

the access allowance determiner allows the access of the target system image when the second access identification information or the first access identification information is consistent with the target identification information, and the access allowance determiner provides completer abort information to the target system image when the second access identification information is not consistent with the target identification information or the first access identification information is not consistent with the target identification information.

32. The PCIe function of claim 27, wherein the access identification information storage removes the first access identification information when the data packet receiver receives a data packet including target identification information similar to second access identification information.

33. The PCIe function of claim 27, wherein the access allowance determiner allows the access of the target system image when second access identification information and the target identification information satisfy a condition, and the access allowance determiner provides completer abort information to the target system image when the second access identification information and the target identification information do not satisfy a condition.

34. The PCIe function of claim 27, wherein the access identification information provider provides the first access identification information to the assigned system image by using one of a vendor-defined message, a vendor-defined capability, a new PCIe capability defined by a user, Management Component Transport Protocol (MCTP) over SMbus (System Manager bus), and MCTP over PCIe.

35. A computing system, comprising:

a plurality of Peripheral Component Interconnect Express (PCIe) functions, and a PCIe function among the plurality of PCIe functions configured to:

store access identification information for allowing an access to the PCIe function provided from a host, receive a data packet including target identification information indicating a target system image from the target system image, the target system image being one of a plurality of system images included in the host, and determine whether or not to allow an access of the target system image based on the access identification information and the target identification information.

36. The computing system of claim 35, wherein the computing system further comprising:

the host configured to:

generate the access identification information, and provide the access identification information to the PCIe function.

37. The computing system of claim 35, wherein the target system image stores the access identification information, generates a data packet including the access identification information, and provides the data packet to the PCIe function to access the PCIe function.

38. The computing system of claim 35, wherein the access identification information is included in a prefix of the data packet.

39. The computing system of claim 36, wherein the host further comprises a virtualization intermediary managing the plurality of system images.

40. The computing system of claim 35, wherein the access identification information is generated by one of the corresponding system image and the virtualization intermediary.

41. The computing system of claim 35, wherein the host provides the access identification information to the PCIe function by using one of a vendor-defined message, a vendor-defined capability, a new PCIe capability defined by a user, Management Component Transport Protocol (MCTP) over SMbus (System Manager bus), and MCTP over PCIe.

* * * * *